(12) United States Patent
Waghmare et al.

(10) Patent No.: US 12,540,346 B2
(45) Date of Patent: Feb. 3, 2026

(54) TEST STRIPS FOR COMMUNICATING ASSAY DATA TO A TOUCHSCREEN, AND SYSTEMS FOR ANALYZING ASSAY DATA RECEIVED AT A TOUCHSCREEN

(71) Applicant: University of Washington, Seattle, WA (US)

(72) Inventors: Anandghan Waghmare, Seattle, WA (US); Shwetak N. Patel, Seattle, WA (US); Farshid Salemi Parizi, Seattle, WA (US); Jason Hoffman, Seattle, WA (US)

(73) Assignee: University of Washington, Seattle, WA (US)

( * ) Notice: Subject to any disclaimer, the term of this patent is extended or adjusted under 35 U.S.C. 154(b) by 391 days.

(21) Appl. No.: 18/352,863

(22) Filed: Jul. 14, 2023

(65) Prior Publication Data
US 2024/0018565 A1 Jan. 18, 2024

Related U.S. Application Data

(60) Provisional application No. 63/389,711, filed on Jul. 15, 2022.

(51) Int. Cl.
*C12Q 1/00* (2006.01)
*B01L 3/00* (2006.01)
(Continued)

(52) U.S. Cl.
CPC .......... *C12Q 1/006* (2013.01); *B01L 3/5023* (2013.01); *B01L 3/502715* (2013.01);
(Continued)

(58) Field of Classification Search
None
See application file for complete search history.

(56) References Cited

U.S. PATENT DOCUMENTS 10,681,516 B2 * 6/2020 Zin ................... H04M 1/724
2015/0099944 A1 4/2015 James
2021/0307698 A1 * 10/2021 Peabody ............ A61B 5/14552

FOREIGN PATENT DOCUMENTS

CN 104897899 A 9/2015
CN 106859665 A 6/2017
(Continued)

OTHER PUBLICATIONS

"Accu-Chek Aviva Plus Test Strips", https://www.accu-chek.com/test-strips/aviva-plus-test-strips [Online accessed Feb. 13, 2022], 2021, pp. 5.
(Continued)

*Primary Examiner* — Stephen T. Reed
(74) *Attorney, Agent, or Firm* — Stoel Rives LLP

(57) ABSTRACT

Aspects of this disclosure describe a test strip that may include a sample input, assay circuitry, signaling circuitry, impedance circuitry, and/or energy harvesting circuitry. The sample input may be configured to receive a sample, such as a fluid sample. The assay circuitry of the test strip may be configured to perform an assay on at least a portion of the fluid sample. The signaling circuitry of the test strip may be configured to provide a modulated signal based on an output of the assay. The impedance circuitry of the test strip may be configured to present impedance changes to a touchscreen of an electronic device in accordance with the modulated signal. The test strip can then communicate data of the output of the assay (e.g., test results) to the electronic device using the touchscreen of the electronic device.

20 Claims, 12 Drawing Sheets

(51) Int. Cl.
  *C12Q 1/26* (2006.01)
  *G06F 3/041* (2006.01)
  *G06F 3/044* (2006.01)
(52) U.S. Cl.
  CPC .............. *C12Q 1/26* (2013.01); *G06F 3/0416* (2013.01); *G06F 3/044* (2013.01); *B01L 2300/027* (2013.01); *B01L 2300/0645* (2013.01); *B01L 2300/069* (2013.01); *B01L 2300/0825* (2013.01)

(56) References Cited

FOREIGN PATENT DOCUMENTS

| CN | 108508205 | A | 9/2018 |
| CN | 111345826 | A | 6/2020 |
| CN | 113985016 | A | 1/2022 |
| KR | 20170135361 | A | 12/2017 |

OTHER PUBLICATIONS

"Diabetes now affects one in 10 adults worldwide", International Diabetes Federation | https://idf.org/news/diabetes-now-affects-one-in-10-adults-worldwide/, 2021, pp. 7.
"True Metrix Self Monitoring Blood Glucose Meter", https://www.trividiahealth.com/products/blood-glucose-meters-test-strips/true-metrix/, 2021, pp. 5.
Bandodkar, Amay, et al., "Battery-free, skin-interfaced microfluidic/electronic systems for simultaneous electrochemical, colorimetric, and volumetric analysis of sweat", Science Advances 5, Jan. 19, 2019, pp. 15.
Bandodkar, Amay, et al., "Re-usable electrochemical glucose sensors integrated into a smartphone platform", Biosensors and Bioelectronics 101; http://dx.doi.org/10.1016/j.bios.2017.10.019, Oct. 13, 2017, pp. 181-187.
Bankar, Sandip, et al., "Glucose oxidase—An overview", Biotechnol. Adv. 27 | doi: 10.1016/j.biotechadv.2009.04.003, Apr. 15, 2009, pp. 489-501.
Beagley, Jessica, et al., "Global estimates of undiagnosed diabetes in adults", Diabetes Res. Clin. Pract. 103 | http://dx.doi.org/10.1016/j.diabres.2013.11.001, Dec. 2013, pp. 150-160.
Dementyev, Artem, et al., "Power Consumption Analysis of Bluetooth Low Energy, ZigBee and ANT Sensor Nodes in a Cyclic Sleep Scenario", In Proceedings of IEEE International Wireless Symposium (IWS) | DOI: 10.1109/IEEE-IWS.2013.6616827, Apr. 2013, pp. 5.
Escobedo, Pablo, et al., "General-purpose passive wireless point-of-care platform based on smartphone", Biosensors and bioelectronics 141 | https://doi.org/10.1016/j.bios.2019.111360, May 30, 2019, pp. 9.
Everett, Estelle, et al., "A Novel Approach for Fully Automated, Personalized Health Coaching for Adults with Prediabetes: Pilot Clinical Trial", J Med Internet Res 2018 | vol. 20 | iss. 2 | e72 | doi: 10.2196/jmir.9723, 2018, pp. 15.
Ferry, Linda, et al., "Clinical Therapeutics/New Technology—Glucose Monitoring and Sensing", Diabetes 66 | http://diabetesjournals.org/diabetes/article-pdf/66/Supplement_1/A229/534721/db17-890-1488.pdf, Retrieved Sep. 19, 2023, pp. A229-A398.
Fingas, Roger, "The end of smartphones with headphone jacks is nigh, even on budget devices", retrieved from: https://www.androidauthority.com/headphone-jack-3060255/; [Online accessed Feb. 13, 2022], Nov. 28, 2021, pp. 7.
Gaev, Jonathan, "Technology in Health Care", J. F. (ed.) Clinical Engineering Handbook, Biomedical Engineering | DOI:https://doi.org/10.1016/ B978-012226570-9/50088-0, 2004, pp. 342-345.
Gomez Slagle, Helen, et al., "Validation of a novel mobile phone application for type 2 diabetes screening following gestational diabetes mellitus", mHealth 2022; 8:12 | doi: 10.21037/mhealth-21-36 | https://mhealth.amegroups.org/article/view/91864/html, Apr. 20, 2022, pp. 7.
Immanuel, Jincy, et al., "A Perspective on the Accuracy of Blood Glucose Meters During Pregnancy", Diabetes Care 41 | https://doi.org/10.2337/dc18-0833, Oct. 2018, pp. 2053-2058.
Karachaliou, Feneli, et al., "The Challenges in the Development of Diabetes Prevention and Care Models in Low-Income Settings", Front. Endocrinol. 11 | doi: 10.3389/fendo.2020.00518, Aug. 2020, pp. 9.
Liu, Shixian, "Smartphone assisted portable biochip for non-invasive simultaneous monitoring of glucose and insulin towards precise diagnosis of prediabetes/ diabetes", Biosensors and Bioelectronics 209 | https://doi.org/10.1016/j.bios.2022.114251, Apr. 2022, pp. 9.
Mirzajani, Hadi, et al., "An ultra-compact and wireless tag for battery-free sweat glucose monitoring", Biosensors and Bioelectronics 213 | https://doi.org/10.1016/j.bios.2022.114450, Jun. 2022, pp. 11.
Misra, Anoop, et al., "Diabetes in developing countries", J. Diabetes 11 | DOI: 10.1111/1753-0407.12913, Mar. 2019, pp. 523-539.
Montagnana, Martina, et al., "Overview on self-monitoring of blood glucose", Clin. Chimica Acta 402 | doi: 10.1016/j.cca.2009.01.002, 2009, pp. 7-13.
Nemiroskia, Alex, et al., "Universal mobile electrochemical detector designed for use in resource-limited applications", Proc. Natl. Acad. Sci. 111 | www.pnas.org/cgi/doi/10.1073/pnas.1405679111, Aug. 19, 2014, pp. 11984-11989.
Rahmat, M. A. Aizat, et al., "GluQo: IoT-Based Non-invasive Blood Glucose Monitoring", Journal of Telecommunication, Electronic and Computer Engineering vol. 9 No. 3-9: https://jtec.utem.edu.my/jtec/article/view/3128; 2017, Retrieved Sep. 19, 2023, pp. 7.
Soni, Anuradha, et al., "Smartphone based non-invasive salivary glucose biosensor", Analytica Chimica Acta 996; https://doi.org/10.1016/j.aca.2017.10.003, 2017, pp. 54-63.
Tabák, Adam G., et al., "Prediabetes: a high-risk state for diabetes development", The Lancet 379 | DOI: https://doi.org/10.1016/S0140-6736(12)60283-9, Jun. 16, 2012, pp. 2279-2290.
Wang, Hung-Chih, et al., "Development and clinical trial of a smartphone-based colorimetric detection system for self-monitoring of blood glucose", Biomedical Optics Express vol. 11, No. 4, | https://doi.org/10.1364/BOE.389638, Mar. 2020, pp. 2166-2177.
Yang, Jingyi, "Blood glucose monitoring with smartphone as glucometer", Electrophoresis 40 | DOI 10.1002/elps.201800295, Aug. 7, 2018, pp. 1144-1147.
Zhang, Gaobo, et al., "A Noninvasive Blood Glucose Monitoring System Based on Smartphone PPG Signal Processing and Machine Learning", IEEE Transactions on Industrial Informatics, vol. 16, No. 11, Nov. 2020, pp. 7209-7218.

* cited by examiner

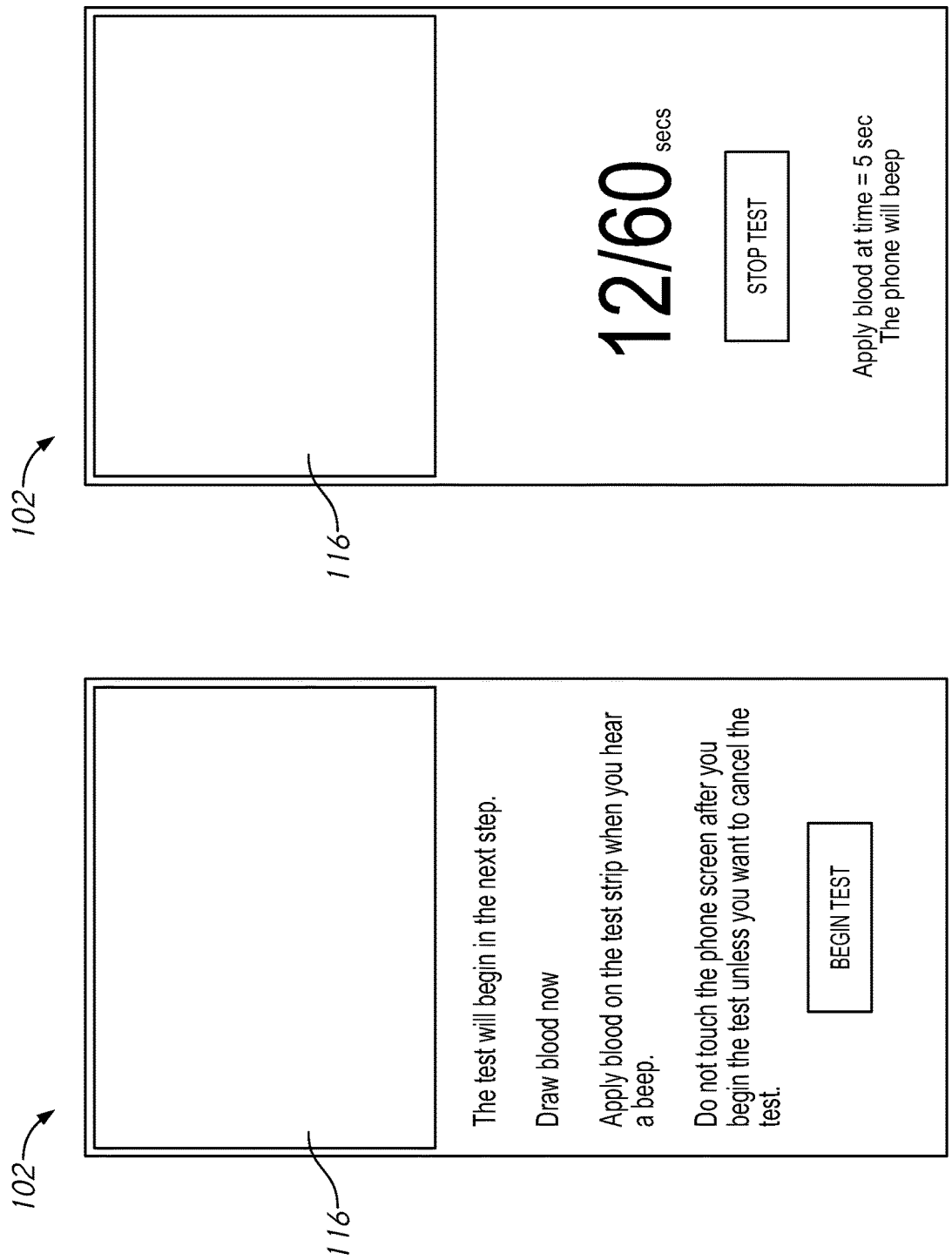

TEST STRIPS FOR COMMUNICATING ASSAY DATA TO A TOUCHSCREEN, AND SYSTEMS FOR ANALYZING ASSAY DATA RECEIVED AT A TOUCHSCREEN

CROSS-REFERENCE TO RELATED APPLICATIONS

This application claims the benefit under 35 U.S.C. § 119(e) of the earlier filing date of U.S. Provisional Application No. 63/389,711 filed Jul. 15, 2022, the entire contents of which are hereby incorporated by reference in their entirety for any purpose.

BACKGROUND

Diabetes mellitus (DM) (generally may be referred to as "diabetes") is a chronic health condition that can lead to serious health issues, including kidney failure, heart disease, and stroke. Unfortunately, worldwide, the percentage or the number of people living with diabetes is rising. For example, as of the year 2021, approximately 537 million adults were living with diabetes. This figure grew by 16% over the last two years and is expected to rise by an alarming 46% by the year 2045, outpacing population growth and leaving one of eight adults in need of treatment.

In the United States alone, 38% of all adults are estimated to have prediabetes. Prediabetes is a condition in which blood sugar, while high, is not sufficiently elevated to be categorized as type 2 diabetes. Prediabetes, however, indicates a likelihood of developing diabetes in the future (or in the near future). Unfortunately, it is estimated that only 19% of at-risk prediabetes patients learn about their condition from a healthcare provider. Therefore, there is a concerning gap between disease risk state and awareness. Accessible preventive screening for diabetes and prediabetes can aid in early detection and, with lifestyle modifications, potential reversal.

Some glucose sensing systems utilize biosensors that can sense blood interactions with external enzymes to calculate blood glucose levels. The enzymes include hexokinase, glucose oxidase (GOx), and/or glucose-1-dehydrogenase (GDH). In laboratory testing (e.g., clinical laboratories, medical laboratories), the hexokinase test is a commonly-used method or technique for detecting glucose using spectrophotometry. On the other hand, glucose biosensors for point-of-care (POC) glucose monitoring devices, such as portable glucose monitors (PGMs) or glucometers, commonly sense interactions of a patient's blood with the enzyme families of GOx and/or GDH. Fortunately, GOx-based assays are accessible, relatively inexpensive, and have relatively relaxed storage requirements. For these reasons, the GOx-based assays can be used in non-laboratory settings. Currently, GOx-based assays are considered to be the "gold standard" for glucose testing using self-monitoring blood glucose devices (e.g., PGMs, glucometers). For commercial use, GOx-based assays are sold as glucose test strips with a dedicated test strip reader (e.g., a PGM, a glucometer).

A widely used blood glucose testing device is the glucometer. The glucometer is a standalone electronic device that interfaces with an electrochemically-activated test strip to provide blood glucose reading(s). Glucometers are used to analyze a small blood sample. The blood sample may be drawn from a fingertip, a vein (venous), or another portion of the body of a patient, and the blood sample is then placed on a test strip. Test strips can be standalone test strip readers or test strips that connect to a smartphone via, for example, Bluetooth or a universal serial bus (USB). Fortunately, the test strips are relatively inexpensive, for example, approximately one or two USD ($) for a single strip. PGM or glucometers, however, can cost anywhere from $20 to $80. Even though preventive prediabetes screening is medically and financially prudent over the long term, a financially disadvantaged individual may find the cost of the glucometer high enough to prevent them from screening to find out whether they are prediabetic (or even diabetic).

Hexokinase-based, GOx-based, and GDH-based procedures, while effective, can be costly and/or can require access to specialized devices (e.g., PGMs, glucometers) or testing facilities (e.g., medical laboratories, clinical laboratories). As a result, many patients (or future patients) remain undiagnosed and/or untreated.

Some other glucose sensing systems utilize non-invasive techniques for measuring blood glucose, such as optical, microwave, and/or electrochemical techniques.

Optical techniques include near-infrared (NIR) spectroscopy, mid-infrared (MIR) spectroscopy, optical polarimetry (OP), Raman spectroscopy, fluorescence-based techniques, and/or optical coherence tomography (OCT). Optical techniques that utilize NIR and MIR spectroscopies use absorption spectroscopy by illuminating a body part with light and analyzing the reflection of the light, which is correlated to blood glucose concentrations. Optical techniques that utilize OP use glucose as an optically-active substance with stable optical rotation. As such, when a polarized beam of light hits a solution containing glucose solutes, glucose induces a certain rotation of the polarized plane of the incident light, and the rotation angle can be used to infer glucose concentration. Optical techniques that utilize Raman spectroscopy laser-illuminate blood vessels and analyze the scattered light, which is related to glucose concentrations. Optical techniques that utilize fluorescence-based techniques use glucose sensing molecules that increase or decrease fluorescence relative to a baseline that depends on the ambient glucose concentration. Optical techniques that utilize OCT use low-coherence light with precise depth focusing ability to evaluate changes in microvasculature, which can be utilized to detect glucose.

Similar to optical techniques, microwave-based technologies illuminate the skin with radio-frequency radiation and analyze the reflected signal. Blood glucose fluctuations impact blood and its underlying tissues' dielectric characteristics, thereby affecting the reflected signal. Both optical-based and microwave-based technologies enable non-invasive and/or continuous monitoring with substantially no (or minimal) bodily or patient discomfort. Unfortunately, the optical-based and microwave-based technologies have a low correlation to actual blood glucose measurements and can be impacted by skin tone, skin condition, and/or age.

Electrochemical-based techniques use the correlation between biofluids (e.g., saliva, tears, sweat, and/or interstitial fluid) and blood glucose concentration to indirectly measure blood glucose. Electrochemical-based techniques, however, may suffer from low sensitivity, delayed measurement results, and/or considerable calibration requirements.

Glucose can also be measured using colorimetric techniques. Some colorimetric tests are non-invasive and use bodily fluid (e.g., saliva, sweat). Some other colorimetric tests use blood samples. Generally, colorimetric techniques provide a visual response proportional to the glucose concentration when a bodily fluid or blood is introduced into the test assay. Unfortunately, colorimetric techniques are susceptible to interference from complex components found in clinical specimens, which can adversely affect their sensitivity and can impose visual detection challenges due to variable color intensities.

Engineers and/or scientists have investigated smartphone-based biosensing due, in part, to the smartphones' expansive availability and connectivity. For example, some smartphones can be configured to utilize their camera(s) in conjunction with an attachment to image standard cholesterol test strips to test the cholesterol level of a patient using the smartphone. As another example, some smartphones can be configured to detect the influenza virus using fluorogenic-based assays. As another example, some smartphones can be configured to quantify vitamin D levels of a patient. As another example, some smartphones can be configured to detect and quantify allergen contamination in food products and/or to identify various biomarkers in, for example, milk extracts. As yet another example, some smartphones can be configured to display results of lateral-flow assays, such as those used to detect malaria and influenza.

Other systems (e.g., smartphones) using cameras can be sensitive to changes in ambient lighting, thereby necessitating additional components and/or accessories, such as a smartphone-specific housing units and/or external illumination modules, to address these ambient light sensitivities. Unfortunately, using these additional components and/or accessories can impair the portability and adaptability of smartphone-based biosensors and/or the detection process.

Some smartphones can be configured to detect fluid viscosity and/or surface tension using sensors, such as LiDAR, cameras, and/or accelerometers. These techniques can aid to detect the liquids' physical properties (e.g., viscosity), which may correlate to their constituents. Unfortunately, predicting blood glucose using fluid viscosity and/or surface tension yields unreliable results.

Many smartphones utilize a capacitive touchscreen. The capacitive touchscreen allows the user to interact with the smartphone using a touch or multiple touches using, for example, one or more of their fingers and/or thumbs. In addition to the user using their finger(s) and/or thumb(s) to interact with the smartphone via the capacitive touchscreen, some engineers and/or scientists have configured the touchscreen's capacitive sensor output to interact with other applications using, for example, tangible widgets. The tangible widgets may include sliders, knobs, and/or other widgets.

BRIEF DESCRIPTION OF THE DRAWINGS

FIGS. 8A, 8B, 8C, 8D, 8E, 8F, and 8G show example screenshots of user instructions and test results, when a user utilizes an application that is installed on a smartphone, in accordance with examples described herein.

DETAILED DESCRIPTION

Certain details are set forth herein to provide an understanding of described embodiments of technology. Nevertheless, other examples may be practiced without various of these particular details. In some instances, well-known circuits, control signals, modulated signals, timing protocols, and/or software operations have not been shown in detail in order to avoid unnecessarily obscuring the described embodiments. Other embodiments may be utilized, and other changes may be made, without departing from the spirit or scope of the subject matter presented here.

Aspects of this disclosure describe a test strip that may include a sample input, assay circuitry, signaling circuitry, impedance circuitry, and/or energy harvesting circuitry. The sample input may be configured to receive a sample, such as a fluid sample. The assay circuitry of the test strip may be configured to perform an assay on at least a portion of the fluid sample. The signaling circuitry of the test strip may be configured to provide a modulated signal based on an output of the assay. The impedance circuitry of the test strip may be configured to present impedance changes to a touchscreen of an electronic device in accordance with the modulated signal. The test strip can then communicate data of the output of the assay (e.g., test results) to the electronic device using the touchscreen of the electronic device.

Figure 1:
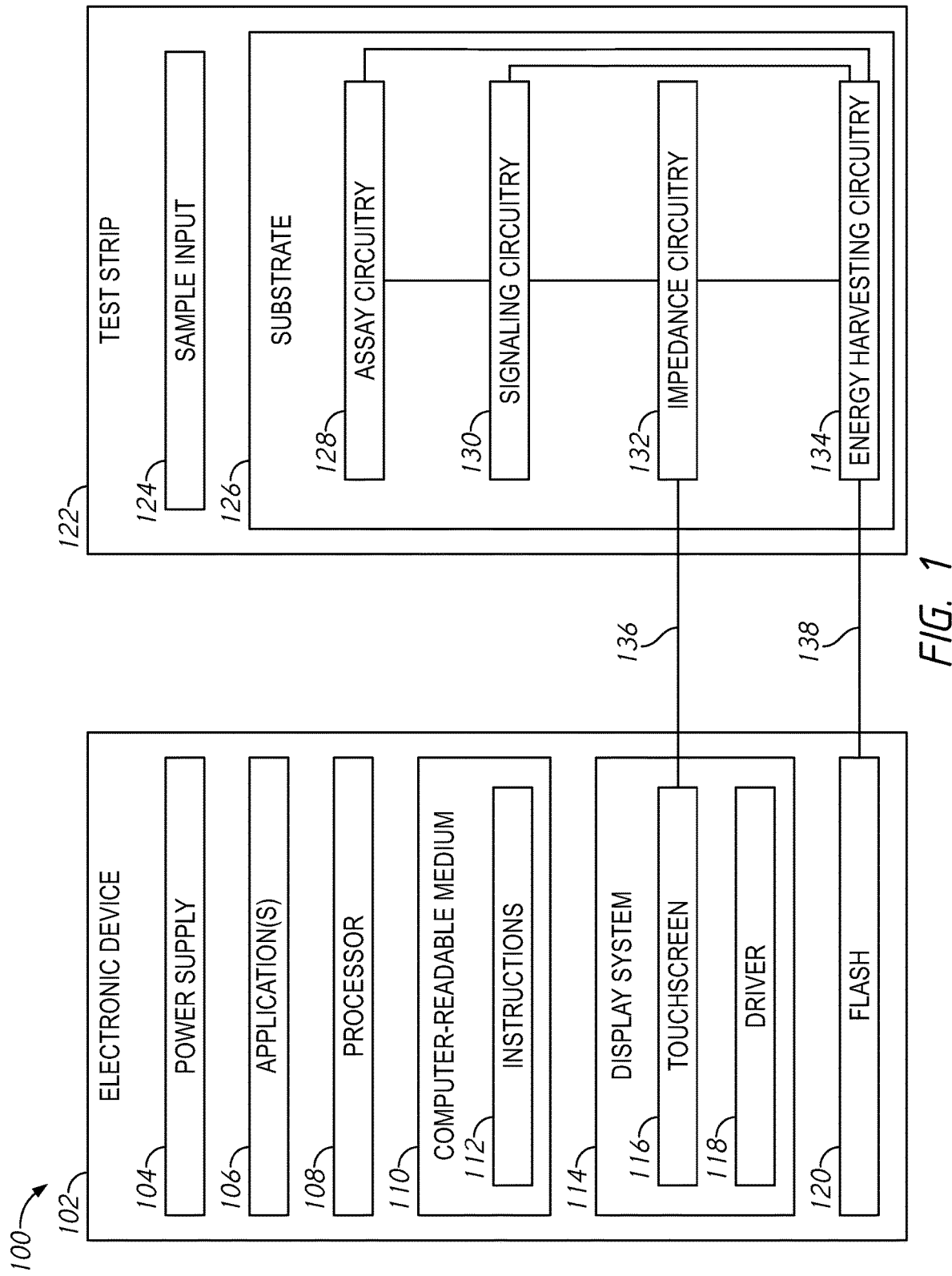
FIG. 1 is a block diagram showing photonic, electrical, and/or communication coupling(s) between an electronic device and a test strip, in accordance with examples described herein.

FIG. 1 is a block diagram 100 showing photonic, electrical, and/or communication coupling(s) between an electronic device 102 and a test strip 122, in accordance with examples described herein.

In some embodiments, the electronic device 102 may include a power supply 104, one or more application(s) 106, a processor 108, a computer-readable medium 110, instructions 112, a display system 114, a touchscreen 116, a driver 118, and a flash 120. Nevertheless, the electronic device 102 may include additional, fewer, or different components than what is illustrated in FIG. 1.

In some embodiments, the test strip 122 may include a sample input 124, a substrate 126, an assay circuitry 128, a signaling circuitry 130, an impedance circuitry 132, and an energy harvesting circuitry 134. Nevertheless, the test strip 122 may include additional, fewer, or different components than what is illustrated in FIG. 1.

In some embodiments, the electronic device 102 may be a smartphone, a tablet, a laptop, a desktop computer, a computing watch, computing eyeglasses, a gaming system or controller, a smart speaker system, an entertainment system, a drawing pad, a netbook, an e-reader, or any other electronic device.

In some embodiments, the power supply 104 may provide power to various components within the electronic device 102. The power supply 104 may include one or more rechargeable, disposable, or hardwire sources, for example, a battery(ies), a power cord(s), an alternating current (AC) to direct current (DC) inverter (AC-to-DC inverter), a DC-to-DC converter, and/or the like. Additionally, or alternatively, the power supply 104 may include one or more types of connectors or components that provide different types of power (e.g., AC power, DC power) to any device that may be connected to the electronic device 102. Additionally, or alternatively, the connector (not illustrated) associated with the power supply 104 may also transmit data to and from any device connected to the electronic device 102. For example, the connector of the power supply 104 may facilitate transmission of data to a database(s), a network, and/or any other device that may be capable of receiving and/or transmitting data.

In some embodiments, the application(s) 106 may be a software, an applet, a peripheral, or other entity that can be used during, or in association with, performing an assay of a sample. In some examples, the application(s) 106 may be implemented wholly or partially using executable instructions stored in computer-readable medium 110. The executable instructions may include instructions which, when executed by processor 108, cause systems and/or devices described herein to perform the actions attributed to application(s) 106 described herein. Generally, the assay may be an investigative (analytic) procedure that may be used in clinical laboratory, laboratory medicine, mining, pharmacology, environmental biology, and/or molecular biology for qualitatively assessing or quantitatively measuring the presence, amount, or functional activity of a target entity. In some embodiments, the measured entity may be referred to as an analyte, a measurand, and/or a target of the assay. The analyte may be a biochemical substance, a chemical element or compound, a drug, and/or a cell in an organism or in an organic sample. Regardless of the type of the assay, the application(s) 106 may be configured to record and/or decode touch events and/or simulated touch events on the touchscreen 116. For example the application(s) 106 may demodulate one or more modulated signals described herein.

In some embodiments, after the user downloads the application(s) 106 on the electronic device 102 (e.g., a smartphone purchased in the marketplace), the user can use the electronic device 102 without additional modifications to the hardware or the operating system (OS) of the electronic device 102. For example, the user need not create a custom kernel to be used with the OS of the electronic device 102. As another example, the user can use the application(s) 106 without needing a "rooting" or a "jailbreaking" of the OS of the electronic device 102. As yet another example, the user need not be an expert, a coder, a software engineer, or a computer scientist in order to download, install, and/or use the application(s) 106 of the electronic device 102.

In some embodiments, the application(s) 106 can be a secured component (e.g., a secured software component) of the electronic device 102 that may meet or exceed laws, regulations, standards, ethics, and/or best practices of a specific industry. For example, when the user utilizes the application(s) 106, the electronic device 102, and/or the test strip 122 to conduct a medical test, the application(s) 106, the electronic device 102, and/or the test strip 122 may meet or exceed the medical standards established by the Health Insurance Portability and Accountability Act of 1996 (HIPAA). In some embodiments, the application(s) 106 may require a user (e.g., a patient) to provide fingerprint, facial, voice, and/or retinal identification, recognition, and/or authentication; a user name and a password; a personal identification number (PIN); a two-factor authentication (2FA); or another form of identification, recognition, and/or authentication before the user (e.g., the verified user, the patient) can utilize the application(s) 106.

In some embodiments, the user can download the application(s) 106 from a website or an application marketplace. Alternatively, or additionally, the application(s) 106 may be pre-installed on the electronic device 102. Alternatively, or additionally, the application(s) 106 may be part of an OS of the electronic device 102. Alternatively, or additionally, the application(s) 106 may be part of the instructions 112. The user may execute the application(s) 106 partially or wholly on the electronic device 102 or on a "cloud" (e.g., on a server). For example, in some embodiments, the application(s) 106 may provide an interface to an online account using a secure internet browser and/or an application programming interface (API).

In some embodiments, the application(s) 106 may guide the user during the process of performing the assay of the sample. For example, the guidance (e.g., instructions) can be displayed on the touchscreen 116 and/or the display system 114. As another example, the instructions can be audible instructions using a speaker (not illustrated in FIG. 1) of the electronic device 102. The instructions may guide the user, for example, by using step-by-step instructions, on how to collect the sample to be analyzed; how to place the sample on the sample input 124 of the test strip 122; how to interpret the results of the assay; and/or other instructions. For example, the other instructions may include instructions to see a specialist. As another example, the other instructions may instruct a patient to consult with a medical doctor. As another example, the other instruction may instruct the patient to make lifestyle changes, such as exercise, diet, or other lifestyle changes. As yet another example, the other instruction may include instructions to visit a reputable website with additional information.

In some embodiments, the processor 108 may be implemented using any electronic device that may be capable of processing, receiving, and/or transmitting the instructions 112 and/or the application(s) 106. The processor 108 may be implemented using one or more processors (e.g., a central processing unit (CPU), a graphic processing unit (GPU)), and/or other circuitry. Examples of the other circuitry may include at least one or more of an application specific integrated circuit (ASIC), a field programmable gate array (FPGA), a microprocessor, a microcomputer, and/or the like. In some embodiments, the processor 108 may be configured to execute the instructions 112 and/or the application(s) 106 in parallel, locally, and/or across a network, for example, by using cloud and/or server computing resources.

In some embodiments, the computer-readable medium 110 may be and/or include any suitable data storage media, such as volatile memory and/or non-volatile memory. Examples of volatile memory may include a random-access memory (RAM), such as a static RAM (SRAM), a dynamic RAM (DRAM), or a combination thereof. Examples of non-volatile memory may include a read-only memory (ROM), a flash memory (e.g., NAND flash memory, NOR flash memory), a magnetic storage medium, an optical medium, a ferroelectric RAM (FeRAM), a resistive RAM (RRAM), and so forth.

In some embodiments, the instructions 112 may be included in, permanently or temporarily saved on, and/or accessed by the computer-readable medium 110. The instructions 112 may include code, pseudo-code, algorithms, models (e.g., machine-learning models), software modules, the OS of the electronic device 102, the application(s) 106, and/or so forth.

In some embodiments, the display system 114 may include the touchscreen 116, where the touchscreen 116 includes or utilizes a touch sensor (not illustrated in FIG. 1). In some embodiments, the touchscreen 116 may utilize a capacitive touch sensor. The touchscreen 116 can detect touch events and/or the simulated touch event(s) 136. In some embodiments, the display system 114 may include one or more touchscreens 116, for example, a front-facing touchscreen, a rear-facing touchscreen, a flexible touchscreen, and so forth. The touchscreen 116 may be integrated with a variety of display technologies and collectively may be incorporated in the display system 114. The display technologies may include a liquid-crystal display (LCD) technology, a light-emitting diode (LED) backlit LCD technology, a thin-film transistor (TFT) LCD technology, an LED display technology, an organic LED (OLED) display technology, an active-matrix OLED (AMOLED) display technology, a super AMOLED display technology, and/or other display technologies.

In some embodiments, the display system 114 may include the driver 118. The driver 118 may be associated with the touchscreen 116 and/or the display system 114. In some embodiments, the driver 118 may generate a signals(s) to, for example, selectively control a brightness, a refresh rate, a resolution, and/or another parameter of the touchscreen 116 and/or the display system 114. In some embodiments, the driver 118 may generate the signal(s) in response to touch events and/or the simulated touch event(s) 136 on the touchscreen 116. In such a scenario, the application(s) 106 and/or the operating system (OS) of the electronic device 102 can interpret the touch events and/or the simulated touch event(s) 136. In some embodiments, the signal generated by the driver 118 may be a modulated signal. In some embodiments, the driver 118 may be used to decode (e.g., demodulate) a modulated signal. For example, the driver 118 can be or can utilize a pulse-width modulation (PWM) circuit (not illustrated) to generate a PWM signal(s). It is to be understood, however, that the driver 118 can utilize or perform other modulation schemes to generate or decode other types of modulated signals. Regardless, of the type of modulation scheme, the application(s) 106 and/or the OS of the electronic device 102 can interpret the touch events and/or the simulated touch event(s) 136 on the touchscreen 116.

In some embodiments, the flash 120 of the electronic device 102 can be (or utilize) a variety of technologies. In some embodiments, the electronic device 102 utilizes one or more LEDs. Generally, the electronic device 102 may not need to use an exotic, an unorthodox, a prohibitively costly, and/or an unusual flash technology. For the purpose of this description, the flash 120 can provide a predictable and/or a reliable amount of light. For example, a flash of a smartphone that is currently sold in the marketplace may meet or exceed the energy (photons) requirements to provide energy to the energy harvesting circuitry 134 of the test strip 122.

In some embodiments, the test strip 122 may be a self-contained test strip and may be designed for single-use or multiple-use (e.g., a reusable test strip) testing(s).

In some embodiments, the sample input 124 may be configured to accept an organic sample, an inorganic sample, or a combination thereof. In some embodiments, the sample may be a fluid sample, a solid sample, a semisolid sample, or combinations thereof. For the sake of brevity, the description focuses on organic samples. For example, the organic sample that may be placed in or on the sample input 124 may include blood, other bodily fluid(s) (e.g., saliva, tears, urine, sweat, interstitial fluid, etc.), and/or tissue(s) of a patient. If the sample is blood or another bodily fluid, the sample input 124 may be, for example, a microfluidic reaction chamber. Additional microfluidic components may be in some examples be provided for sample treatment (e.g., one or more pumps, mixers, valves, channels, reagent chambers, etc.).

In some embodiments, the substrate 126 may be constructed using a variety of materials and/or manufacturing processes. For example, the substrate 126 may be constructed using one or more printed circuit boards (PCBs), one or more flexible PCBs, paper, one or more composite electronic materials (CEMs), one or polyethylene terephthalate (PET) materials, one or more poly ether sulphone (PES) materials, combinations thereof, or other materials. Depending on the type of material of the substrate 126, the substrate 126 may be biodegradable, non-biodegradable, or slowly-biodegradable.

In some embodiments, the test strip 122 may perform an amperometry (e.g., an electroanalytical technique) using the assay circuitry 128 (e.g., a potentiostat) that is embedded in or on the substrate 126 of the test strip 122. The assay circuitry may perform an assay on at least a portion of the fluid sample. In some embodiments, the assay circuitry may perform amperometry using a low power and/or a three-electrode potentiostat.

In some embodiments, the assay circuitry 128 may perform a variety of electrochemical tests. For example, the electrochemical tests may be used to provide a diagnosis (or a prognosis) on the health of the patient. Depending on the electrochemical test, the assay circuitry 128 may measure blood glucose, ketones, blood lipids, or another clinical and/or medical test or measurement. For example, the assay circuitry 128 may perform a GOx-based assay, a GDH-based assay, or another assay. It is to be appreciated that GOx-based and/or GDH-based assays are generally considered accessible, are relatively inexpensive, and have relatively relaxed storage requirements.

In some examples, the assay circuitry 128 may be coupled to the sample input. An electrical and/or fluidic coupling may be provided. In this manner, the assay circuitry 128 may perform an assay on the fluid sample. In some examples, the assay circuitry 128 may be positioned to sample and/or contact fluid from a flow path coupled to the sample input. In some examples, the assay circuitry may provide an output of a lateral flow assay, and a lateral flow path may be used (e.g., provided by the test strip).

In some embodiments, the output of the assay circuitry (e.g., amperometry) is provided to the electronic device 102 via a communication channel, where the communication channel includes the touchscreen 116 of the electronic device 102 of FIG. 1. For example, the test strip 122 may communicate with the electronic device 102 by using simulated touch event(s) 136 on the touchscreen 116 of the electronic device 102. The simulated touch event(s) 136 may periodically simulate (or mimic) touch events that a user may perform on the touchscreen 116 of the electronic device 102. The electronic device 102 and/or the application(s) 106 can then interpret the simulated touch event(s) 136 as touch events of the user on the touchscreen 116 of the electronic device 102. In some embodiments, the amperometry output is communicated by encoding the data in the timings of these touch events using a modulated signal.

In some embodiments, the signaling circuitry 130 may be coupled to the assay circuitry 128, and the signaling circuitry 130 may provide a modulated signal based on an output of the assay. Therefore, the signaling circuitry 130 may be, or may include, a modulator. The modulator may be a pulse-width modulation (PWM) modulator (or simply referred to as a pulse-width modulator), a phase-shift keying (PSK) modulator, a frequency-shift keying (FSK) modulator, an amplitude-shift keying (ASK) modulator, a quadrature amplitude modulation (QAM) modulator, or another type of modulator.

In some embodiments, the impedance circuitry 132 may be coupled to the signaling circuitry 130. The impedance circuitry 132 may present impedance changes to the touchscreen 116 of the electronic device 102 in accordance with the modulated signal from the signaling circuitry 130. The impedance circuitry 132 of the test strip 122 may be electrically coupled to the touchscreen 116 of the electronic device 102. The electronic coupling may in some examples be temporary (e.g., during and/or after a test). The impedance circuitry 132 can then generate and present simulated touch event(s) 136 to the touchscreen 116 to communicate the output of the assay (e.g., the results of the test).

In some embodiments, the energy harvesting circuitry 134 may be coupled to the assay circuitry 128, the signaling circuitry 130, and/or the impedance circuitry 132. The energy harvesting circuitry 134 may capture energy from photons or other environmental sources. The energy captured by the energy harvesting circuitry 134 can then power the assay circuitry 128, the signaling circuitry 130, and/or the impedance circuitry 132 of the test strip 122. In some embodiments, the energy harvesting circuitry 134 may use illumination or photons 138 emitted by the flash 120 of the electronic device 102 to harvest the energy used to power the components of the test strip 122.

Although not illustrated as such in FIG. 1, the test strip 122 may also include a battery, a capacitor, or another energy storage component. The storage component may be used if the electronic device 102 does not include a flash. For example, assume the electronic device 102 includes the touchscreen 116 but does not include the flash 120 (not illustrated as such in FIG. 1). In such a scenario, the energy harvesting circuitry 134 of the test strip 122 can capture ambient light and temporarily store the captured energy on the energy storage component (not illustrated in FIG. 1) of the test strip 122. After an adequate amount of energy is stored on the energy storage component, the energy storage components can then power the assay circuitry 128, the signaling circuitry 130, and/or the impedance circuitry 132 of the test strip 122.

Figure 2:
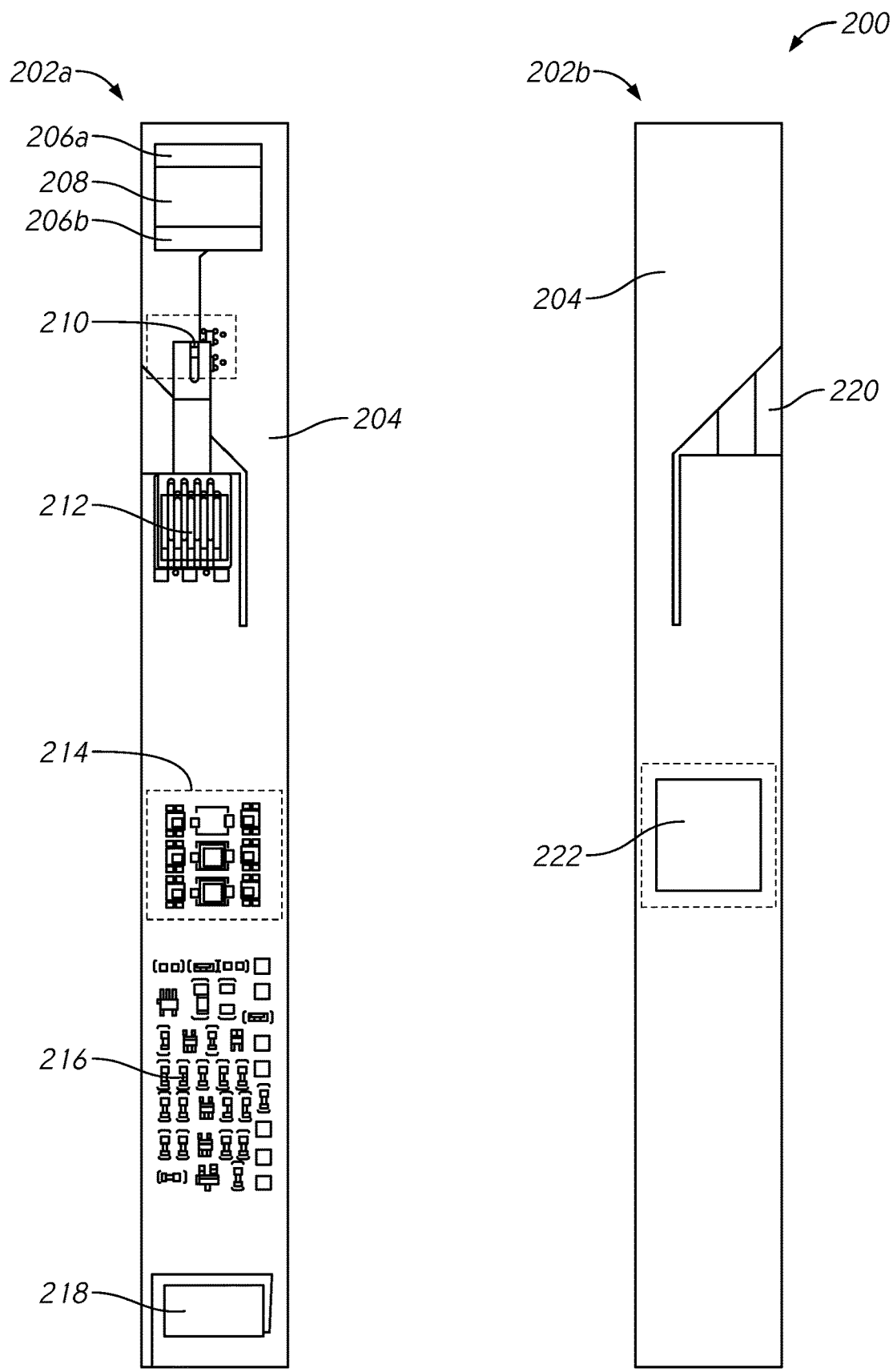
FIG. 2 illustrates a front view and a rear view of an example test strip, in accordance with examples described herein.

FIG. 2 illustrates a front view 202*a* and a rear view 202*b* of an example test strip 200. FIG. 2 is illustrated and described in the context of FIG. 1. The test strip 200 of FIG. 2 may be an implemented example of the test strip 122 of FIG. 1. It is to be understood that the test strip 200 of FIG. 2 is a non-limiting implementation. The shape, the size, and/or the material of the substrate of the test strip 200 of FIG. 2 may be more suitable to be used if the electronic device 102 of FIG. 1 is a smartphone having, for example, a front-facing touchscreen (e.g., the touchscreen 116 of FIG. 1) and flash, which may be a rear-facing flash (e.g., the flash 120 of FIG. 1).

In some embodiments, the front view 202*a* of the test strip 200 may include a substrate 204, a conductive material 206*a*, a conductive material 206*b*, an adhesive material 208, a sample input 210, an adapter 212, energy harvesting circuitry 214, integrated assay and impedance circuitry 216, and an adhesive material 218. Nevertheless, the front view 202*a* of the test strip 200 may include additional, fewer, or different components than what is illustrated in FIG. 2.

The rear view 202*b* of the test strip 200 illustrates a cutting 220 that helps the user to couple (e.g., adhere) the test strip 200 to their electronic device 102 of FIG. 1, for example, their smartphone. In some embodiments, the cutting 220 can aid the user to bend or fold the test strip 200. For example, the cutting 220 may be positioned at a location where the user should bend and/or fold the test strip to accommodate their electronic device. In some embodiments, the cutting 220 of the test strip 200 allows the test strip 200 to be used in conjunction with smartphones (e.g., electronic devices 102) of different makes and/or models. For example, a first smartphone of a first make and/or of a first model may have a first size, a first shape, a first location of the touchscreen 116 of FIG. 1, and/or a first location of the flash 120 of FIG. 1. As another example, a second smartphone of a second make and/or of a second model may have a second size, a second shape, a second location of the touchscreen 116 of FIG. 1, and/or a second location of the flash 120 of FIG. 1. The cutting 220 of the test strip 200, however, allows the user to selectively configure the test strip 200 to be coupled (e.g., adhered) to the first smartphone or the second smartphone.

In some embodiments, the rear view 202*b* of the test strip 200 may include user instructions 222. For example, the user instructions 222 may state "this area should cover the smartphone's flash;" "align the flash of your electronic device with the marked area of the test strip 200;" or another phrase having a similar message for the user of the electronic device 102 of FIG. 1, the application(s) 106 of FIG. 1, and/or the test strip (e.g., the test strip 200 of FIG. 2, and/or the test strip 122 of FIG. 1).

In some embodiments, the test strip 200 can be manufactured using readily available components, or components with a substantially good manufacturing scalability, in order to maintain a low price. The low price can be especially advantageous if the test strip (e.g., the test strip 122, the test strip 200) is a single-use test strip.

A prototype construction of the test strip 200 includes the substrate 204 with length and width of approximately 19 centimeters by 2.7 centimeters (19 cm×2.7 cm), respectively. The substrate 204 (e.g., a prototype substrate) is a flexible PCB constructed using a 0.23 millimeters (mm) thick polyimide. The polyimide may be referred to as the "base material" of the substrate 204. The traces (e.g., signal traces, not illustrated in FIG. 2) embedded in or on the substrate 204 may be laid out with a copper material having an approximately 55 micrometer (um) thickness. A polymer-based solder mask may cover the base material and/or the traces of the substrate 204. The remaining exposed copper may be gold plated using the electroless nickel immersion gold (ENIG) process. The electrical components (e.g., the energy harvesting circuitry 214, the integrated assay and impedance circuitry 216, the conductive material 206*a*, and/or the conductive material 206*b*) may be attached to the substrate 204 using reflow soldering or another manufacturing process.

In some embodiments, the conductive material 206*a* and/or the conductive material 206*b* are configured to provide the simulated touch events (e.g., impedance changes) to the touchscreen 116 of the electronic device 102 of FIG. 1.

In some embodiments, the adhesive material 208 can be implemented using an adhesive tape (e.g., a double-sided adhesive tape). The adhesive tape adheres well to the touchscreen 116 of the electronic device 102 (e.g., a smartphone), and the adhesive tape substantially easily peels away without damaging or leaving residue on the touchscreen 116 of the electronic device 102.

Similarly, in some embodiments, the adhesive material 218 can be implemented using an adhesive tape (e.g., a double-sided adhesive tape). This adhesive tape adheres well to the casing electronic device 102 (e.g., the rear side of a smartphone), and the adhesive tape may generally easily peel away without damaging or leaving residue on the casing of the electronic device 102.

To test the accuracy of this prototype, the test strip 200 can be configured to perform an enzyme-based oxidation reaction using already commercially available and/or already FDA-approved glucose test strips. For example, the test strip 200 can be configured to perform the enzyme-based oxidation reaction using the Accu-Chek® and the True Metrix® glucose test strips. A first design (e.g., shape) of the adapter 212 can be used for the Accu-Chek® glucose test strip, and a second design (e.g., shape) of the adapter 212 can be used for the True Metrix® glucose test strip.

In some embodiments, the test strip 200 may detect and measure the glucose reaction of the blood of the patient by using the resources of the electronic device 102 of FIG. 1. For example, the test strip 200 may capture the output of the amphoteric glucose assay. The test strip 200 may communicate the results of the assay to the electronic device 102 of FIG. 1 in real-time or in near real-time using simulated touch event(s) 136 on the touchscreen 116 of electronic device 102. The electronic device 102 of FIG. 1 and/or the application(s) 106 of FIG. 1 can then process the results of the assay using computational resources of the electronic device 102. After processing the results of the assay, the electronic device 102 can then display the results of the assay on the touchscreen 116 and/or display system 114 of the electronic device 102.

Figure 3:
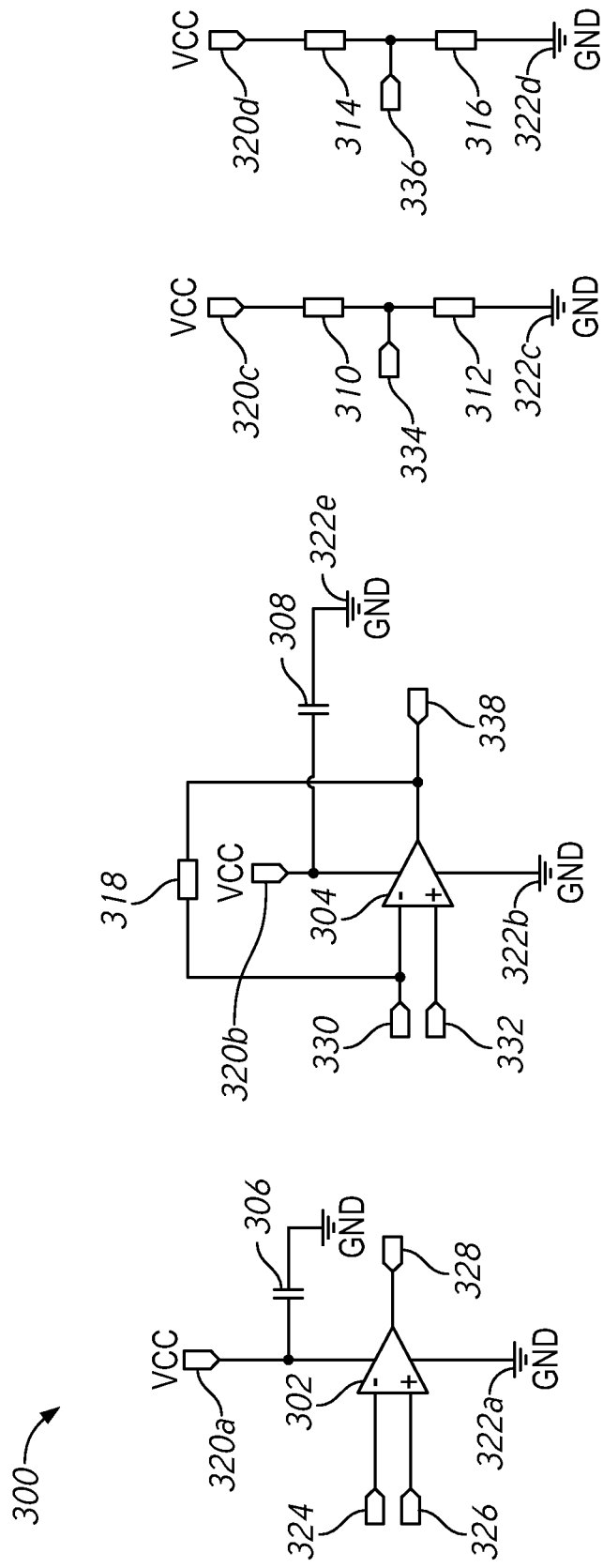
FIG. 3 shows a schematic of a potentiostat, in accordance with examples described herein.

FIG. 3 shows a schematic of a potentiostat 300, in accordance with examples described herein. The potentiostat 300 of FIG. 3 is an example circuitry of the assay circuitry 128 of FIG. 1.

In some embodiments, the potentiostat 300 may include an operational amplifier 302, an operational amplifier 304, a capacitor 306, a capacitor 308, a resistor 310, a resistor 312, a resistor 314, a resistor 316, a resistor 318, a VCC 320a, a VCC 320b, a VCC 320c, a VCC 320d, a GND 322a, a GND 322b, a GND 322c, a GND 322d, a GND 322e, a reference electrode voltage 324, a glucose low voltage 326, a counter electrode voltage 328, a working electrode voltage 330, a glucose high voltage 332, a potentiometer output voltage 338, a glucose low voltage 334, and a glucose high voltage 336. Nevertheless, the potentiostat 300 may include additional, fewer, or different components than what is illustrated in FIG. 3.

In some embodiments, the VCCs 320a-320d (and/or any other VCC) may be coupled together or may reference the same voltage node (e.g., a high voltage node). Similarly, in some embodiments, the GNDs 322a-322e (and/or any other GND) may be coupled together or may reference the same ground node (e.g., a low voltage node).

In some embodiments, the glucose low voltage 334 may be coupled between the resistor 310 and the resistor 312; the resistor 310 may be coupled between the VCC 320c and the glucose low voltage 334; and the resistor 312 may be coupled between the glucose low voltage 334 and the GND 322c. In some embodiments, the value of the resistor 310 may be higher than the value of the resistor 312. For example, the resistor 310 may be an approximately two megaohms (MΩ) resistor, and the resistor 312 may be an approximately 680 kiloohms (kΩ) resistor.

In some embodiments, the glucose high voltage 336 may be coupled between the resistor 314 and the resistor 316; the resistor 314 may be coupled between the VCC 320d and the glucose high voltage 336; and the resistor 316 may be coupled between the glucose high voltage 336 and the GND 322d. In some embodiments, the value of the resistor 314 may be the same as the value of the resistor 316. For example, the resistor 314 may be an approximately one (1) MΩ resistor, and the resistor 316 may be an approximately one (1) MΩ resistor.

In some embodiments, the capacitor 306 and the capacitor 308 may be approximately 100 nanofarad (nF) capacitors.

In some embodiments, the value of the resistor 318 may be selected to reach a desired or a threshold sensitivity. Example values of the resistor 318 are 196 kΩ, 100 kΩ, or another value, depending on the technology of the other components of the potentiostat 300, the test strip (e.g., the test strip 122, the test strip 200), and/or the assay circuitry (e.g., the assay circuitry 128 of FIG. 1).

In some embodiments, the potentiostat 300 may be a three-electrode potentiostat, where the three electrodes include the reference electrode voltage 324, the counter electrode voltage 328, and the working electrode voltage 330. Furthermore, the potentiostat 300 may include two operational amplifiers: the operational amplifier 302 and the operational amplifier 304. The operational amplifier 302 may be the same as, or different from, the operational amplifier 304. Nevertheless, to decrease the cost of the potentiostat 300, it may behoove the manufacturer to utilize a similar or the same technology for the operational amplifier 302 and the operational amplifier 304.

In some embodiments, the three electrodes and the two operational amplifiers of the potentiostat 300 can be configured to perform, for example, an amperometric glucose concentration measurement.

In some embodiments, the reference electrode voltage 324 may be coupled to the inverting input node of the operational amplifier 302; the glucose low voltage 326 may be coupled to the non-inverting input node of the operational amplifier 302; the VCC 320a may be coupled to the positive power supply node of the operational amplifier 302; the GND 322a may be coupled to the negative power supply node of the operational amplifier 302; and the counter electrode voltage 328 may be coupled to the output node of the operational amplifier 302.

In some embodiments, the differential inputs of the operational amplifier 302 may include the glucose low voltage 326 and the reference electrode voltage 324. The operational amplifier 302 can then amplify the difference in voltage between the glucose low voltage 326 and the reference electrode voltage 324. Note that the output voltage (e.g., the counter electrode voltage 328) of the operational amplifier 302 may depend on the open-loop gain (A) value (e.g., 100 dB) of the operational amplifier 302.

In some embodiments, the working electrode voltage 330 may be coupled to the inverting input node of the operational amplifier 304; the glucose high voltage 332 may be coupled to the non-inverting input node of the operational amplifier 304; the VCC 320b may be coupled to the positive power supply node of the operational amplifier 304; the GND 322b may be coupled to the negative power supply node of the operational amplifier 304; the resistor 318 may be coupled between the inverting input node of the operational amplifier 304 and the output node of the operational amplifier 304; the capacitor 308 may be coupled between the inverting input node of the operational amplifier 304 and the GND 322e; and the potentiometer output voltage 338 may be coupled to the output node of the operational amplifier 304.

In some embodiments, the differential inputs of the operational amplifier 304 include the working electrode voltage 330 and the glucose high voltage 332. The operational amplifier 304 can then amplify the difference in voltage between the working electrode voltage 330 and the glucose high voltage 332. Note that the output voltage (e.g., the potentiometer output voltage 338) of the operational amplifier 304 may depend on the open-loop gain (A) value (e.g., 100 dB) of the operational amplifier 304.

Figure 4:
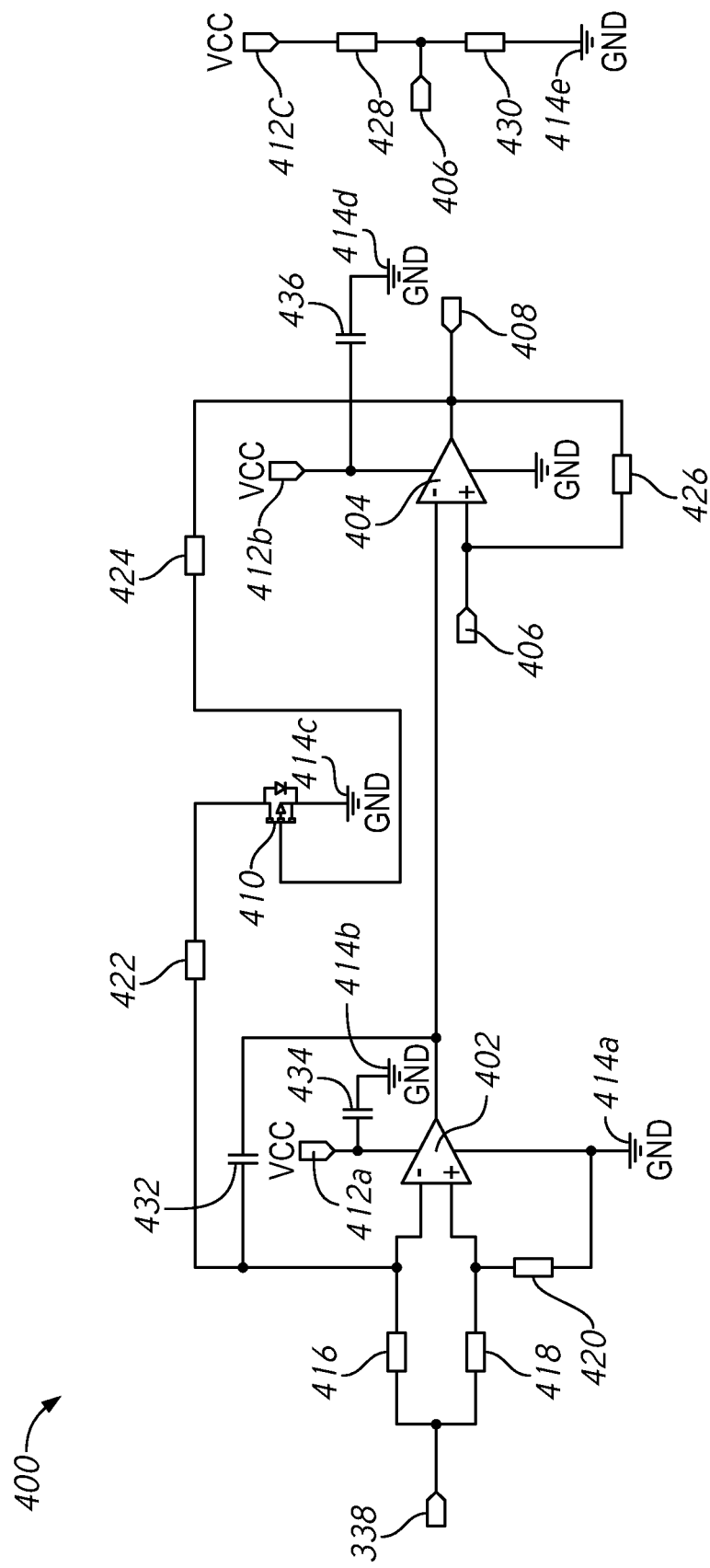
FIG. 4 shows a schematic of a pulse-width modulator, in accordance with examples described herein.

FIG. 4 shows a schematic of a pulse-width modulator 400, in accordance with examples described herein. The pulse-width modulator 400 of FIG. 4 is an example circuitry of the signaling circuitry 130 of FIG. 1.

In some embodiments, the pulse-width modulator 400 may include a potentiometer output voltage 338 of FIG. 3, an operational amplifier 402, an operational amplifier 404, a voltage controlled oscillator (VCO) voltage 406, a VCO output voltage 408, an n-channel MOSFET 410, a VCC 412a, a VCC 412b, a VCC 412c, a GND 414a, a GND 414b, a GND 414c, a GND 414d, a GND 414e, a resistor 416, a resistor 418, a resistor 420, a resistor 422, a resistor 424, a resistor 426, a resistor 428, a resistor 430, a capacitor 432, a capacitor 434, and a capacitor 436. Nevertheless, the pulse-width modulator 400 may include additional, fewer, or different components than what is illustrated in FIG. 4.

For the sake of brevity, the couplings of components of the pulse-width modulator 400 are not described in exhaustive detail. Nevertheless for the sake of clarity, as is illustrated in FIG. 4, the potentiometer output voltage 338 of FIG. 3 is coupled into a VCO. The VCO may be constructed as a voltage integrator coupled to a Schmitt trigger. The VCO outputs voltage pulses (VCO output voltage 408), where the width of each pulse is proportional to the output voltage value (potentiometer output voltage 338) of the potentiostat 300 of FIG. 3.

In some embodiments, the VCCs 412a-412c (and/or any other VCC) may be coupled together or may reference the same voltage node (e.g., a high voltage node). Similarly, in some embodiments, the GNDs 414a-414e (and/or any other GND) may be coupled together or may reference the same ground node (e.g., a low voltage node).

In some embodiments, the VCO voltage 406 may be coupled between the resistor 428 and the resistor 430; the resistor 428 may be coupled between the VCC 412c and the VCO voltage 406; and the resistor 430 may be coupled between the VCO voltage 406 and the GND 414e. In some embodiments, the value of the resistor 428 may be substantially the same as the value of the resistor 430, for example, one (1) MΩ.

In some embodiments, the resistor 416 may be approximately two (2) MΩ; the resistor 418 may be approximately one (1) MΩ; the resistor 420 may be approximately one (1) MΩ; the resistor 422 may be approximately one (1) MΩ; the resistor 424 may be approximately 680 kΩ; the resistor 426 may be approximately two (2) MΩ.

In some embodiments, the capacitor 432 and the capacitor 436 may be approximately 100 nF capacitors.

Figure 5:
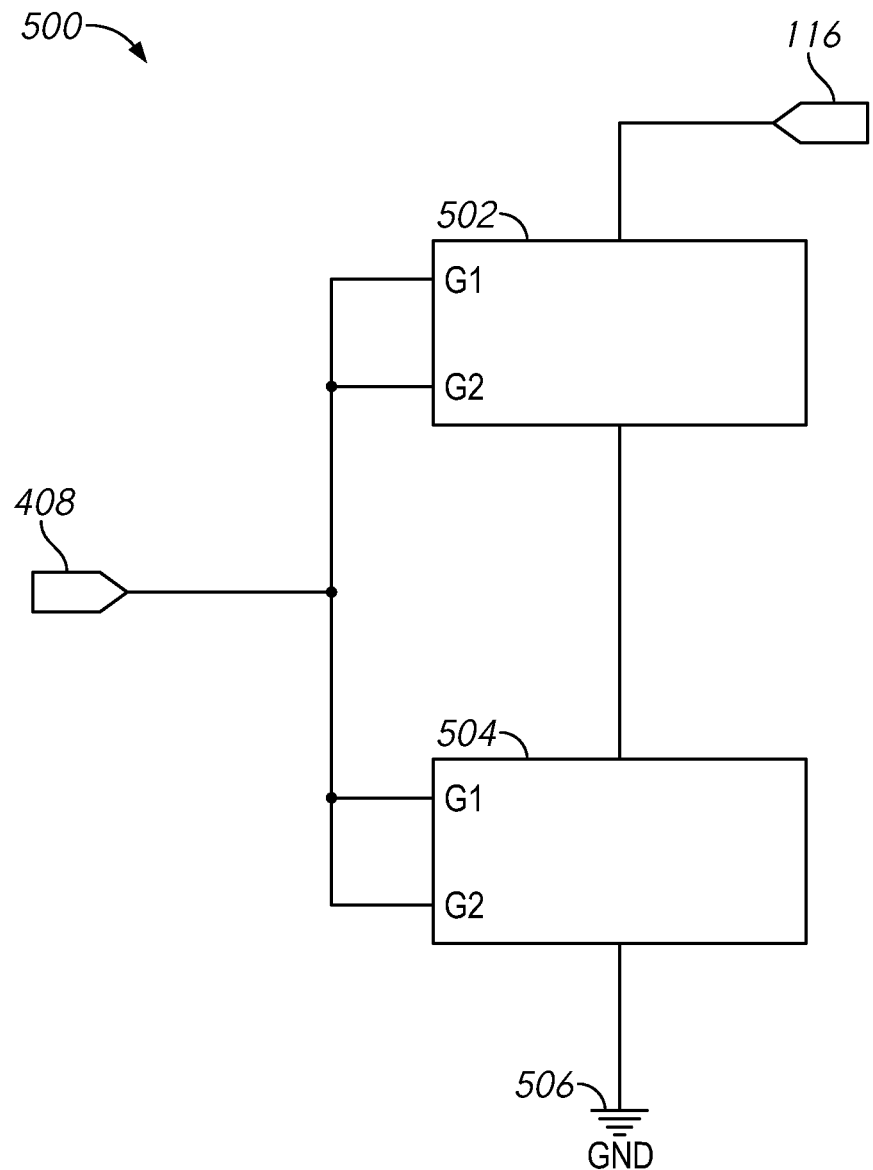
FIG. 5 shows a schematic of a touch event circuitry, in accordance with examples described herein.

FIG. 5 shows a schematic of touch event circuitry 500, in accordance with examples described herein. The touch event circuitry 500 of FIG. 5 is an example circuitry of the impedance circuitry 132 of FIG. 1. The touch event circuitry 500 may provide an output to a touchscreen that may simulate a touch event.

In some embodiments, the touch event circuitry 500 may include a MOSFET 502 and a MOSFET 504. The MOSFET 502 and the MOSFET 504 may be coupled in a cascode configuration, for example, as is illustrate in FIG. 5. Nevertheless, the touch event circuitry 500 may include additional, fewer, or different components than what is illustrated in FIG. 5.

In some embodiments, the touch event circuitry 500 can be coupled between the VCO output voltage 408 of FIG. 4 and the touchscreen 116 of FIG. 1. The output pulses (e.g., the VCO output voltage 408) of the pulse-width modulator 400 of FIG. 4 can drive the touch event circuitry 500. The touch event circuitry 500 of FIG. 5 can then simulate touch events on the touchscreen 116 of the electronic device 102 with a duration that may be proportional to the VCO output voltage 408 of FIG. 4. Moreover, in some embodiments, the period and/or the duty cycle of a simulated touch event may be proportional to the potentiometer output voltage 338 of FIG. 3.

In some embodiments, the touch event circuitry 500 of FIG. 5 simulates touch events on the touchscreen 116 of the electronic device 102 of FIG. 1 by causing impedance change(s) at the point of contact (e.g., conductive materials 206a and 206b of FIG. 2) with the touchscreen 116. These impedance changes may be sufficiently large, or are greater than a threshold impedance change, causing the electronic device 102 to interpret the impedance change(s) as a user touching (e.g., touch event(s)) the touchscreen 116 of the electronic device 102.

In some embodiments, the electronic device 102 may not be able to differentiate between a user touching the touchscreen 116 and a simulated touch event(s) 136 generated by the touch event circuitry 500 of FIG. 5 (or the impedance circuitry 132 of FIG. 1).

In some embodiments, the MOSFETs 502 and 504 may provide a path for an electrical charge(s), which may be generated by the touchscreen 116 of FIG. 1, to flow to a ground node or a ground trace of the test strip 122 and/or the test strip 200. To do so effectively, the cascode configuration of the MOSFETs 502 and 504 may improve the electrical isolation between the capacitive touchscreen 116 and the circuitry (e.g., components) of the test strip 122 of FIG. 1 and/or the test strip 200 of FIG. 2.

In some embodiments, a test strip (e.g., test strip 122, test strip 200) that may be attached, coupled, or adhered to the back of the electronic device 102 (e.g., the smartphone) may also capacitively couple with the electronic device 102's ground. By so doing, the test strip may appear electrically larger. Therefore, the test strip may simulate a larger impedance change, thereby allowing the touch event circuitry 500 to simulate touch events (e.g., the simulated touch event(s) 136 of FIG. 1) properly, distinguishably, and/or effectively.

Figure 6:
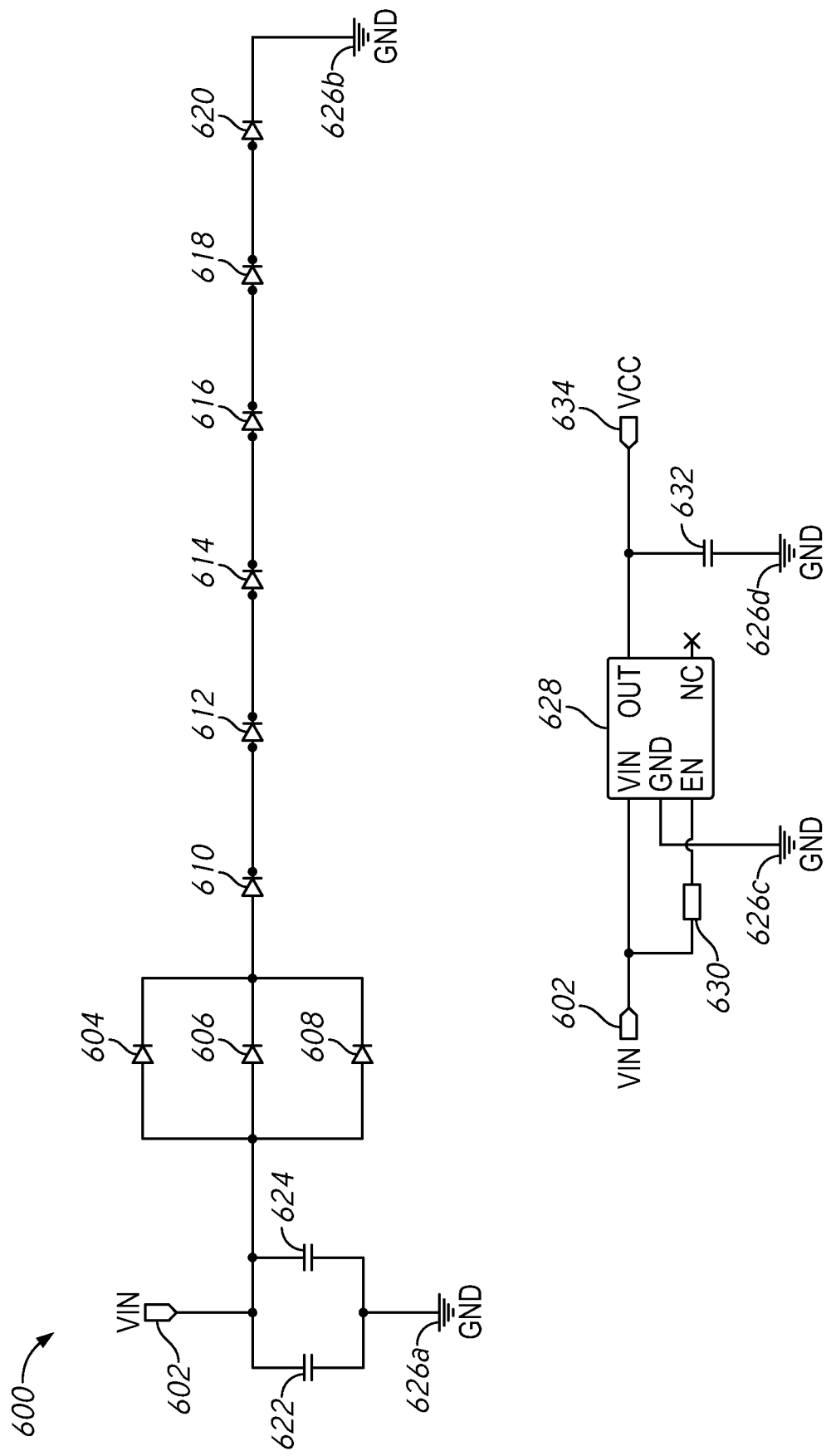
FIG. 6 shows a schematic of an energy harvesting circuitry, in accordance with examples described herein.

FIG. 6 shows a schematic of an energy harvesting circuitry 600, in accordance with examples described herein. The energy harvesting circuitry 600 of FIG. 6 is an example circuitry of the energy harvesting circuitry 134 of FIG. 1.

In some embodiments, the energy harvesting circuitry 600 may include a photodiode output voltage 602, a photodiode 604, a photodiode 606, a photodiode 608, a photodiode 610, a photodiode 612, a photodiode 614, a photodiode 616, a photodiode 618, a photodiode 620, a capacitor 622, a capacitor 624, a GND 626a, a GND 626b, a GND 626c, a GND 626d, a low-voltage regulator 628, a resistor 630, a capacitor 632, and a VCC 634. Nevertheless, the energy harvesting circuitry 600 may include additional, fewer, or different components than what is illustrated in FIG. 6.

In some embodiments, the photodiode 604, the photodiode 606, and the photodiode 608 may be coupled in parallel. It is to be understood that the energy harvesting circuitry 600 may be modified to have additional or fewer photodiodes coupled in parallel. These parallel coupled photodiodes are configured to harvest energy from the flash 120 of electronic device 102 of FIG. 1 (or from ambient light). In some embodiments, the energy harvested by the parallel coupled photodiodes meets or exceeds the energy needs to power the assay circuitry 128 (e.g., the potentiostat 300); the signaling circuitry 130 (e.g., the pulse-width modulator 400); the impedance circuitry 132 (e.g., the touch event circuitry 500); and/or the energy harvesting circuitry 134 (e.g., the energy harvesting circuitry 600).

In some embodiments, the photodiode 610, the photodiode 612, the photodiode 614, the photodiode 616, the photodiode 618, and the photodiode 620 may be coupled in series. It is to be understood that the energy harvesting circuitry 600 may be modified to have additional or fewer photodiodes coupled in series. These series coupled photodiodes can boost the photodiode output voltage 602 to, for example, 2.5 volts (V) or another voltage potential.

Although not illustrated as such in FIG. 6, alternatively, or additionally, the energy harvesting circuitry 600 may include a voltage booster integrated circuit (IC). The series coupled photodiodes, however, may be less financially costly compared to a voltage IC. Therefore, to lower the manufacturing cost of the test strip, a manufacturer may use the series coupled photodiodes 610-620 instead of a voltage IC.

In some embodiments, the capacitor 622 and the capacitor 624 may be coupled in parallel to form a capacitor bank. The capacitor bank may filter the photodiode output voltage 602, and the capacitor bank can handle power surges at the output of the photodiodes. In some embodiments, each of the capacitor 622 and the capacitor 624 may be, for example, a 300 microfarad (F) capacitor.

In some embodiments, the photodiode output voltage 602 may be coupled to a low-voltage regulator 628, as is illustrated in FIG. 6. The low-voltage regulator 628 can then maintain an output voltage VCC 634 of, for example, 1.8 V. Therefore, in some embodiments, the potential voltage of the VCC 634 may be lower than the potential voltage of the photodiode output voltage 602. The VCC 634 of FIG. 6 may be coupled to, for example, the VCCs 320*a*-320*d* of FIG. 3, the VCCs 412*a*-412*c* of FIG. 4, and/or any other VCC in the test strip (e.g., the test strip 122, the test strip 200).

In some embodiments, the GNDs 626*a*-626*d* (and/or any other GND) may be coupled together or may reference the same ground node (e.g., a low voltage node). In some embodiments, the GNDs 626*a*-626*d* of FIG. 6 may be coupled to, or may reference the same ground node, as the GNDs 322*a*-322*e* of FIG. 3, GNDs 414*a*-414*e* of FIG. 4, the GND 506 of FIG. 5, and/or any other ground signal or ground trace embedded in or on the test strip (e.g., the test strip 122, the test strip 200).

Figure 7:
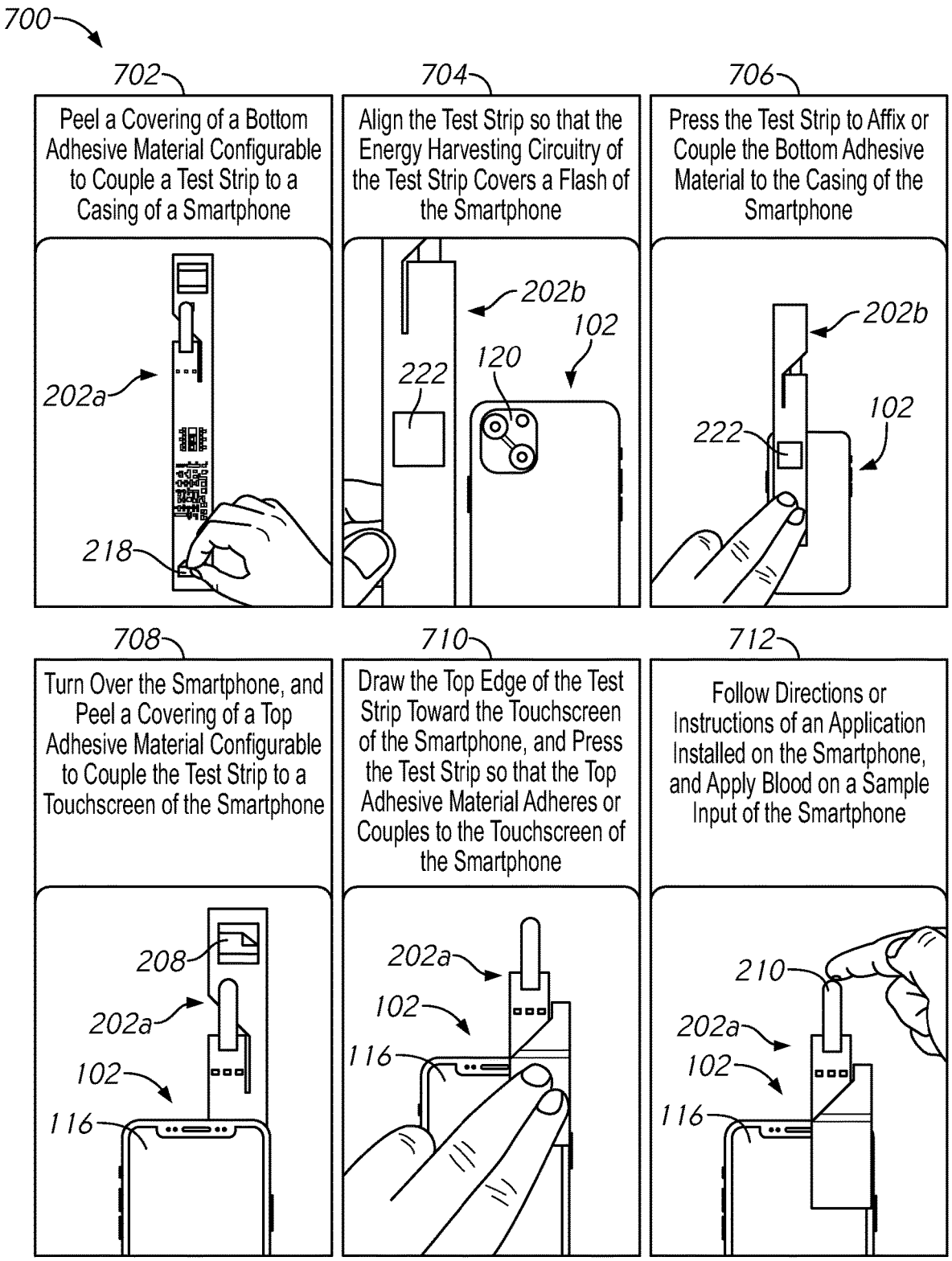
FIG. 7 shows a method for attaching the test strip of FIG. 2 to a smartphone, in accordance with examples described herein.

FIG. 7 shows a method 700 for attaching a test strip 200 to an electronic device 102, according to examples described herein. FIG. 7 is illustrated and described in the context of FIGS. 1 to 6. The method 700 may also be or include user instructions on how to perform a clinical test or a medical test, such as measuring the glucose level of a patient's blood.

For the sake of clarity and brevity, FIG. 7 focuses on the test strip being the test strip 200 of FIG. 2. FIG. 7 shows the front view 202*a* and the rear view 202*b* of the test strip 200 of FIG. 2. The method 700, however, can be also applicable to the test strip being the test strip 122 of FIG. 1. Similarly, FIG. 7 focuses on the electronic device 102 being a smartphone. The method 700, however, can be applicable to the electronic device 102 being another type of electronic device.

In some embodiments, at block 702, the method 700 may include a user peeling a covering of a bottom adhesive material (e.g., adhesive material 218 of FIG. 2), which can be configured to couple the test strip (e.g., the test strip 200) to a casing of the electronic device 102 (e.g., a smartphone). The casing of the smartphone can be the rear side (or the rear view) of the smartphone, or the casing can be an after-market (e.g., added) casing that the user may have installed to, for example, protect their smartphone.

In some embodiments, at block 704, the method 700 may include the user aligning the test strip (e.g., the test strip 200) so that the energy harvesting circuitry (e.g., the energy harvesting circuitry 600, the energy harvesting circuitry 134) of the test strip covers a flash (e.g., the flash 120) of the smartphone. Note that, at block 704, the user has flipped the test strip, as is illustrated by the rear view 202*b* of the test strip 200 of FIG. 2. The alignment may be made with aid of the cutting described herein in some examples.

In some embodiments, at block 706, the method 700 may include the user pressing the test strip (e.g., the test strip 200) to affix or couple the bottom adhesive material (e.g., the adhesive material 218) to the casing of the smartphone. As described, the test strip 200 may include user instructions 222 of FIG. 2 that may be printed on the test strip.

In some embodiments, at block 708, the method 700 may include the user turning over the smartphone, and the user peeling a covering of a top adhesive material (e.g., the adhesive material 208 of FIG. 2). The top adhesive material is configurable to couple the test strip to a touchscreen (e.g., the touchscreen 116 of FIG. 1) of the smartphone.

In some embodiments, at block 710, the method 700 may include the user drawing the top edge of the test strip toward the touchscreen of the smartphone, and the user pressing the test strip so that the top adhesive material (e.g., the adhesive material 208 of FIG. 2) adheres or couples to the touchscreen (e.g., the touchscreen 116 of FIG. 1) of the smartphone. Note that the test strip includes an elongated portion that allows the user to fold the test strip.

In some embodiments, at block 712, the method 700 may include the user following directions or instructions of an application (e.g., application(s) 106 of FIG. 1), which is installed on the smartphone. The user can apply blood (or another bodily or non-bodily fluid) on a sample input (e.g., the sample input 124 of FIG. 1, the sample input 210 of FIG. 2) of the smartphone.

FIGS. 8A, 8B, 8C, 8D, 8E, 8F, and 8G show example screenshots of user instructions and test results when a user utilizes an application that is installed on a smartphone, in accordance with examples described herein. The application of FIGS. 8A-8G is an example application of the application(s) 106 of electronic device 102. The screenshots of the application illustrated in FIGS. 8A-8G also show that this particular application is called "GlucoScreen." FIGS. 8A, 8B, 8C, 8D, 8E, 8F, and 8G illustrate the various screens of an application (e.g., the GlucoScreen application) intended for usage by the GlucoScreen's end user(s) in a glucose screening scenario.

Figure 8B:
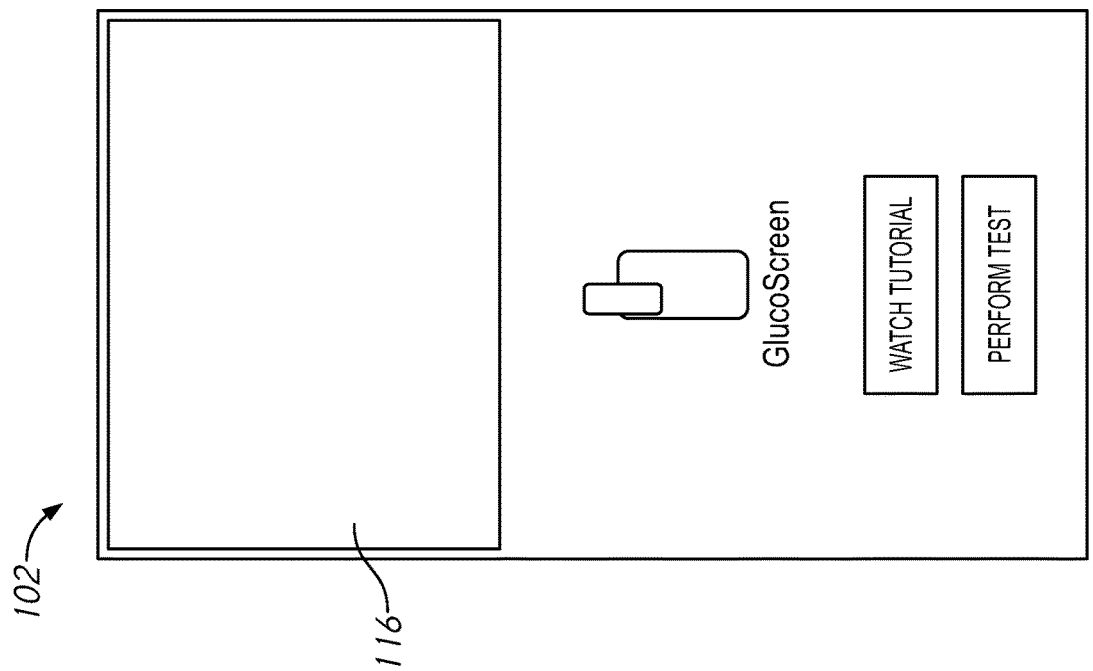
Figure 8A:
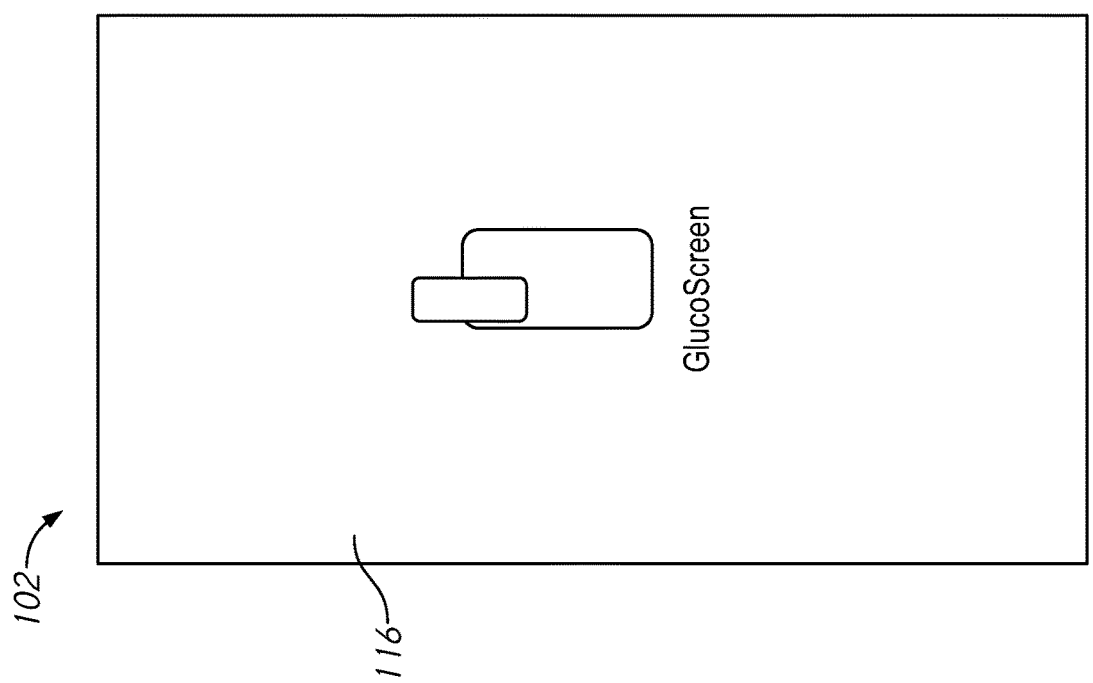

In some embodiments, as is illustrated in FIG. 8A, the application (e.g., the application(s) 106 of FIG. 1) may begin with a splash screen (e.g., on the touchscreen 116) that may briefly display the application's logo and name (e.g., GlucoScreen).

In some embodiments, as is illustrated in FIG. 8B, on the application's home screen, users may view a tutorial video on how to use the GlucoScreen application. Viewing the tutorial video may not be a requirement because the video may be a supplementary material. In some embodiments, for example, when the user has previously used the GlucoScreen application, the user may skip viewing the tutorial video and start performing the glucose test. The user starts performing the test by selecting the "perform test" tab.

Figure 8D:
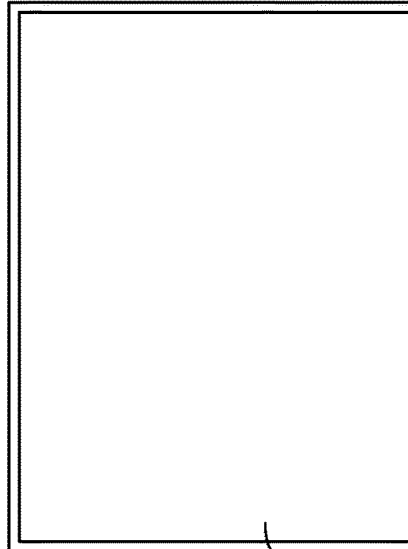
Figure 8D:
Figure 8D:
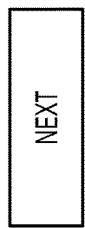
Figure 8C:
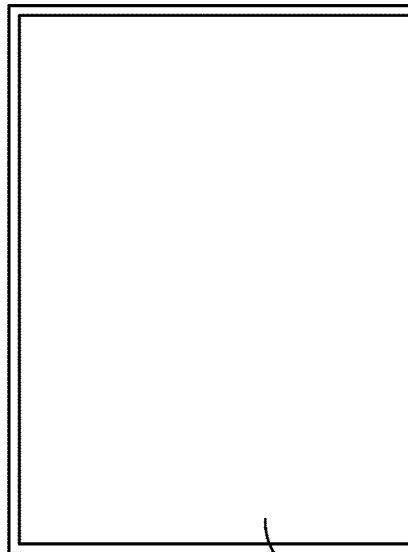
Figure 8C:
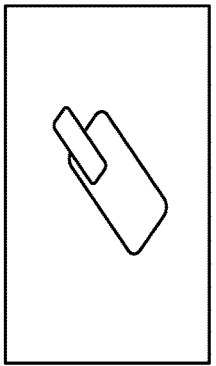
Figure 8C:
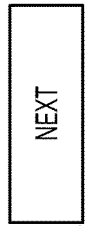

In some embodiments, as is illustrated in FIG. 8C, after the user selects the "perform test" tab of FIG. 8B, the GlucoScreen application instructs the user through the various processes required to perform a glucose test. The GlucoScreen application may prompt the user to attach the test strip (e.g., the test strip 122, the test strip 200) on the smartphone (e.g., the electronic device 102). An example grey square at the top of the touchscreen may indicate the location on the smartphone's touchscreen, where the user can adhere the test strip. After the user adheres the test strip on the smartphone, the user may select "next."

In some embodiments, as is illustrated in FIG. 8D, the GlucoScreen application may prompt the user to place the smartphone on a flat stable surface (e.g., on a table). By so doing, the tests can be performed consistently, and the user can avoid accidentally touching the touchscreen of the smartphone during the test (e.g., the glucose test). Note that the description details that the test strip communicates with the electronic device 102, in part, by simulating touch events on the touchscreen. Therefore, it is to be understood that, in some embodiments, the user touching the touchscreen may be disruptive during the data transfer from the test strip to the smartphone via its touchscreen.

In some embodiments, as is illustrated in FIG. 8E, the GlucoScreen application may instruct the user to draw blood. The GlucoScreen application may provide additional instructions before conducting the test (e.g., the glucose test), for example, as is illustrated in FIG. 8E. After the user follows the instructions, the user can then press "begin test."

In some embodiments, once a glucose test starts, the GlucoScreen application may begin to collect touchscreen data. In some embodiments, following the start of the test, as is illustrated in FIG. 8F, the GlucoScreen application may display the time remaining and the time elapsed of the test. For example, after five (5) seconds, the GlucoScreen application may beep to indicate that the user needs to apply blood to the glucose testing location (e.g., the sample input 124 of FIG. 1, the sample input 210 of FIG. 2). After the beep, the GlucoScreen application may collect data for 60 additional seconds. To process the data from the glucose reading captured on the smartphone, the GlucoScreen application first decodes the signal. The data stored on the smartphone (e.g., the potentiostat's PWM output) may be represented as a series of pulses of varying widths, each pulse may represent a data point having a magnitude proportional to the pulse width. The original signal may be obtained by calculating all pulse widths and using them as amplitudes for every point. The acquired signal may then be filtered using a Butterworth low-pass filter with a cutoff frequency of, for example, 3 Hz. Next, the resultant signal may be segmented to trim the signal to have data from the time of the application of the blood to the test strip until the end of the test.

In some embodiments, the signals acquired from the GlucoScreen application may have a distinctive shape. For example, the signals may exhibit a sharp drop in signal magnitude; the sharp drop may be followed by a prominent peak; and the prominent peak may be followed by a gradual decline proportional to the glucose concentration. The sudden drop may represent the time at which the blood (or the glucose solution) is applied on the sample input 210 of the test strip. This signature shape may be used to crop the signal (e.g., by the processor in accordance with the executable instructions shown and described with regard to FIG. 1) to have data from the time of the application of the blood to the test strip until the end of the test. The resulting signal can then be used to determine the glucose concentration.

Figure 8G:
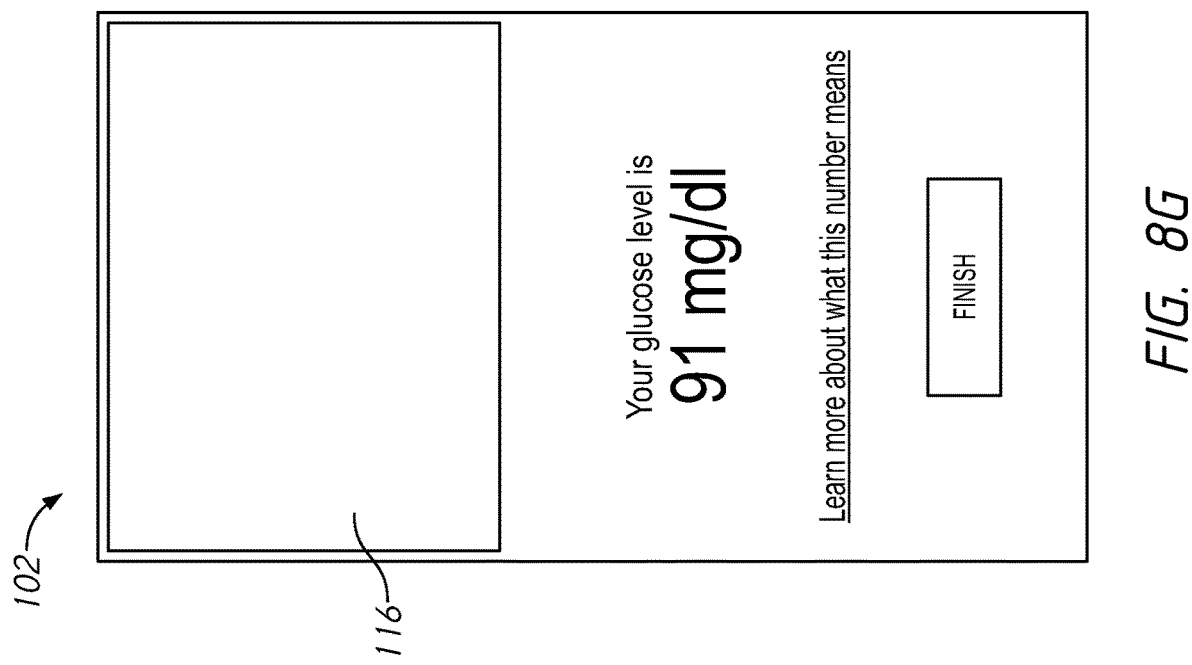

In some embodiments, at the completion of the test, as is illustrated in FIG. 8G, the GlucoScreen application uses the resource of the smartphone to calculate the glucose value of the user's (e.g., patient's) blood. In some embodiments, the GlucoScreen application may include and display a link to an external resource (e.g., a reputable medical website) that contains additional information about the glucose level. Based on the test results and/or the external resource, the user may make a well-informed determination whether the user (e.g., patient) needs to change their diet, exercise, and/or see a medical doctor. The medical doctor can then determine a proper diagnosis and/or a prognosis. If the patient is prediabetic or diabetic, the medical doctor can also prescribe medication.

Figure 9:
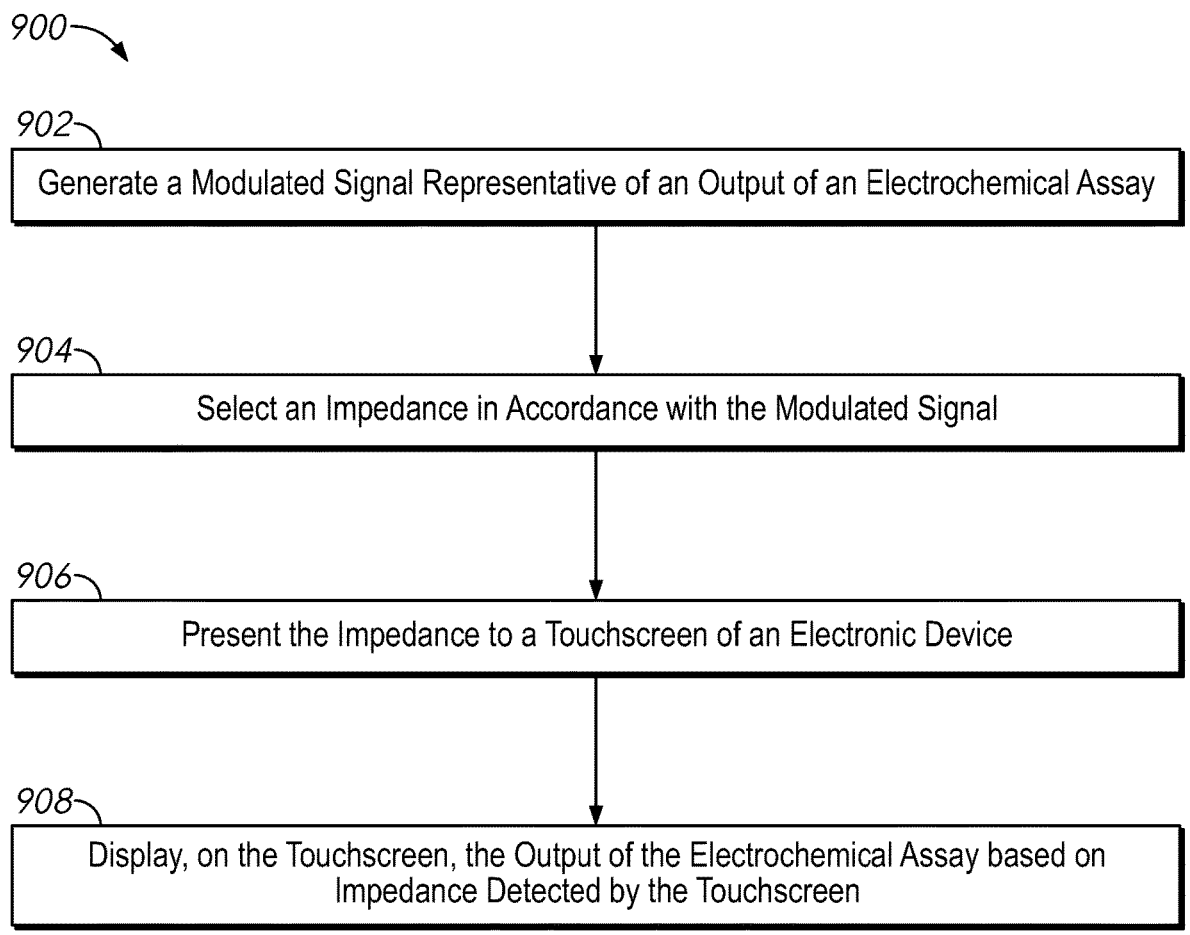
FIG. 9 illustrates a method for conducting a test using the test strip and the electronic device, in accordance with examples described herein.

FIG. 9 illustrates a method for conducting a test using the test strip and the electronic device 102, in accordance with examples described herein. The test strip may be test strip 122 and/or test strip 200.

In block 902, method 900 generates a modulated signal representative of an output of an electrochemical assay. In block 904, method 900 selects an impedance in accordance with the modulated signal. In block 906, method 900 presents the impedance to a touchscreen (e.g., touchscreen 116 of FIG. 1) of the electronic device 102. In block 908, method 900 displays, on the touchscreen, the output of the electrochemical assay based on impedance detected by the touchscreen.

Additional Details

Undetected and untreated prediabetes and diabetes are serious health conditions with life-threatening complications. With early detection and lifestyle changes, health outcomes can significantly improve. Current logistical and cost challenges of visiting healthcare venues or purchasing blood testing equipment for infrequent use may reduce or discourage prescreening. A cost-effective and/or convenient solution, such as the application(s) 106, the GlucoScreen application, the test strip 122, and/or the test strip 200, can decrease downstream healthcare costs for treatment.

The test strip 122 and/or test strip 200 can be used with an electronic device (e.g., a smartphone) that the user may already use for other purposes. Therefore, the user need not purchase a dedicated electronic device to use the test strip. The test strip communicates with the smartphone using a capacitive touchscreen of the smartphone. Communicating with the touchscreen may be less expensive and/or more convenient than using power-hungry and/or costly electronic components to deploy a USB, a BLE®, a WiFi®, or another wired or wireless communication interface(s) between the test strip and the electronic device.

The prototype test strip (e.g., the test strip 200 of FIG. 2) uses low power (e.g., 20 µW) to power the components embedded in or on the test strip. As described, the test strip includes energy harvesting circuitry, which can be configured to receive adequate and/or reliable energy from the flash of the electronic device 102. Therefore, the test strip may not need its own power supply (e.g., a battery, a capacitor).

A preliminary cost estimate for the prototype test strip (e.g., the test strip 200) may be somewhere between $2.00 and $3.00 (e.g., $2.80) per test strip. The prototype test strip may be modified to include a plurality of biosensors (e.g., glucose biosensors). For example, a test strip with two glucose testing sites (e.g., two sample inputs 210) may cost, for example, $1.40 for each blood glucose test.

The prototype test strip uses a polymer substrate. Nevertheless, the test strip may be modified to use other types of substrate materials, such as eco-friendlier and/or sustainable materials. For example, the prototype test strip may be modified to use a paper substrate.

In some embodiments, the electronic components of the test strip may be recycled and/or reused after performing a blood test.

In some embodiments, the signal traces of the prototype test strip may be redesigned and may be embedded in or on a printed circuit board (PCB). The passive and active electronic components of the test strip can then be coupled on the PCB.

In some embodiments, printable organic photodiodes can replace the currently used photodiodes (e.g., the photodiodes of the energy harvesting circuitry 600 of FIG. 6) of the prototype test strip (e.g., the test strip 200 of FIG. 2). The printable organic photodiodes are environmentally friendly and may further reduce the cost of the test strip.

Alternatively to the test strip 122 and/or the test strip 200, an audio-port-based communication mechanism may be used to communicate between a test strip and an electronic device. Smartphone manufacturers, however, have been phasing out audio ports from their latest products. Therefore, the audio-port-based communication may have limited use.

From the foregoing it will be appreciated that, although specific embodiments have been described herein for purposes of illustration, various modifications may be made while remaining within the scope of the claimed technology.

Examples described herein may refer to various components as "coupled" or signals as being "provided to" or "received from" certain components. It is to be understood that in some examples the components are directly coupled one to another, while in other examples the components are coupled with intervening components disposed between them. Similarly, signals or communications may be provided directly to and/or received directly from the recited components without intervening components, but also may be provided to and/or received from the certain components through intervening components.

What is claimed is:

1. An apparatus comprising:
    a substrate;
    a sample input coupled to the substrate, wherein the sample input is configured to receive a fluid sample;
    assay circuitry on the substrate, wherein the assay circuitry is configured to perform an assay on at least a portion of the fluid sample;
    signaling circuitry on the substrate, the signaling circuitry configured to provide a modulated signal based on an output of the assay; and
    impedance circuitry on the substrate, the impedance circuitry coupled to the signaling circuitry, the impedance circuitry configured to present impedance changes to a touchscreen of an electronic device in accordance with the modulated signal.

2. The apparatus of claim 1, wherein the assay circuitry comprises electrochemical assay circuitry.

3. The apparatus of claim 1, wherein the modulated signal is a pulse-width modulated signal.

4. The apparatus of claim 1, wherein the substrate is configured to couple to the touchscreen of the electronic device such that the impedance changes are detected by the touchscreen as touch events.

5. The apparatus of claim 1, wherein the substrate further comprises energy harvesting circuitry on the substrate, and wherein the energy harvesting circuitry is coupled to the assay circuitry, the signaling circuitry, the impedance circuitry, or combinations thereof.

6. The apparatus of claim 5, wherein the substrate is configured to couple to the electronic device such that the energy harvesting circuitry is positioned to receive illumination from a flash of the electronic device.

7. The apparatus of claim 1, wherein the assay circuitry comprises a potentiostat.

8. A system comprising:
    a test strip comprising:
        assay circuitry configured to perform an assay on an input sample;
        signaling circuitry configured to provide a modulated signal based on an output of the assay; and
        impedance circuitry configured to present one or more impedance changes based on the modulated signal;
    an electronic device comprising:
        a touchscreen positioned to receive the one or more impedance changes from the impedance circuitry;
        a processor; and
        at least one non-transitory computer-readable medium encoded with instructions, which, when executed by the processor, cause the processor to detect the one or more impedance changes.

9. The system of claim 8, wherein the impedance circuitry is coupled between the signaling circuitry and the touchscreen.

10. The system of claim 8, wherein the electronic device or an application thereof is configured to demodulate the modulated signal.

11. The system of claim 8, wherein the input sample comprises blood, another bodily fluid, or another non-bodily fluid.

12. The system of claim 8, wherein the touchscreen is a capacitive touchscreen.

13. The system of claim 8, wherein the electronic device comprises a display system, and wherein the touchscreen is embedded in the display system.

14. The system of claim 13, wherein the display system is configured to display the output of the assay based on the one or more impedance changes.

15. A method comprising:
    generating a modulated signal representative of an output of an electrochemical assay;
    selecting an impedance in accordance with the modulated signal;
    presenting the impedance to a touchscreen of an electronic device; and
    displaying, on the touchscreen, the output of the electrochemical assay based on impedance detected by the touchscreen.

16. The method of claim 15 further comprising detecting the impedance using the touchscreen.

17. The method of claim 16 further comprising demodulating the modulated signal using the electronic device, an application thereof, a component thereof, or combinations thereof.

18. The method of claim 16 further comprising interpreting the impedance as a touch event on the touchscreen.

19. The method of claim 15, further comprising applying a fluid sample to an input of a test strip, wherein the test strip is coupled to the touchscreen.

20. The method of claim 15, wherein the modulated signal comprises a pulse width modulated signal.

* * * * *